(12) United States Patent
Harvill

(10) Patent No.: US 11,020,869 B2
(45) Date of Patent: Jun. 1, 2021

(54) AUTOMATED APPLICATION OF CUT THERMAL ADHESIVE FILMS

(71) Applicant: Zazzle Inc., Redwood City, CA (US)

(72) Inventor: Young Harvill, El Granada, CA (US)

(73) Assignee: ZAZZLE INC., Redwood City, CA (US)

( * ) Notice: Subject to any disclaimer, the term of this patent is extended or adjusted under 35 U.S.C. 154(b) by 0 days.

(21) Appl. No.: 16/707,159

(22) Filed: Dec. 9, 2019

(65) Prior Publication Data

US 2020/0147819 A1  May 14, 2020

Related U.S. Application Data

(63) Continuation of application No. 16/201,803, filed on Nov. 27, 2018, now Pat. No. 10,507,589, which is a continuation of application No. 15/072,169, filed on Mar. 16, 2016, now Pat. No. 10,137,590.

(60) Provisional application No. 62/133,946, filed on Mar. 16, 2015.

(51) Int. Cl.

| | |
|---|---|
| *B26D 3/00* | (2006.01) |
| *B26D 5/00* | (2006.01) |
| *B26F 1/00* | (2006.01) |
| *B44C 1/00* | (2006.01) |
| *G05B 19/00* | (2006.01) |
| *B26D 3/08* | (2006.01) |
| *B26F 1/38* | (2006.01) |
| *B44C 1/16* | (2006.01) |
| *G05B 19/4097* | (2006.01) |

(52) U.S. Cl.
CPC ............... *B26D 3/085* (2013.01); *B26D 5/00* (2013.01); *B26F 1/00* (2013.01); *B26F 1/3813* (2013.01); *B44C 1/162* (2013.01); *G05B 19/4097* (2013.01)

(58) Field of Classification Search
None
See application file for complete search history.

(56) References Cited

U.S. PATENT DOCUMENTS

| | | | |
|---|---|---|---|
| 5,637,174 A | 6/1997 | Field et al. | |
| 6,224,707 B1 * | 5/2001 | Lion | ........................ B32B 27/10 |
| | | | 156/230 |
| 2009/0025123 A1 * | 1/2009 | Weedlun | .............. B23K 26/389 |
| | | | 2/244 |
| 2013/0102225 A1 * | 4/2013 | Komorous-Towey | .... B32B 5/02 |
| | | | 446/490 |
| 2019/0091885 A1 | 3/2019 | Harvill | |

OTHER PUBLICATIONS

The International Searching Authority, "Search Report" in application No. PCT/US 2016/026683, dated Jun. 6, 2016, 7 pages.
Current Claims in application No. PCT/US 2016/002683, dated Jun. 2016, 3 pages.

* cited by examiner

*Primary Examiner* — Jacob T Minskey
*Assistant Examiner* — Matthew Hoover
(74) *Attorney, Agent, or Firm* — Hickman Becker Bingham Ledesma LLP; Malgorzata A. Kulczycka

(57) ABSTRACT

Method of manufacturing a substrate with a cut thermal film comprises obtaining an input digital image of a design to be transferred to the substrate; storing the input image in memory; rendering design elements of the design as a single output image; based upon a bleed size value, a maximum number of negative areas, a maximum number of positive areas, and attribute values: resizing the image to include a border for bleed; filling transparent areas of the image with the substrate attribute values; creating a cutting path; creating a mask image; inverting the mask image; modifying the mask image to adjust fill areas around details, to limit negative areas to be less than the maximum number of negative areas, and to limit positive areas to be less than the maximum number of positive areas; creating cutting path data in memory as a vector path outlining the mask image.

13 Claims, 15 Drawing Sheets

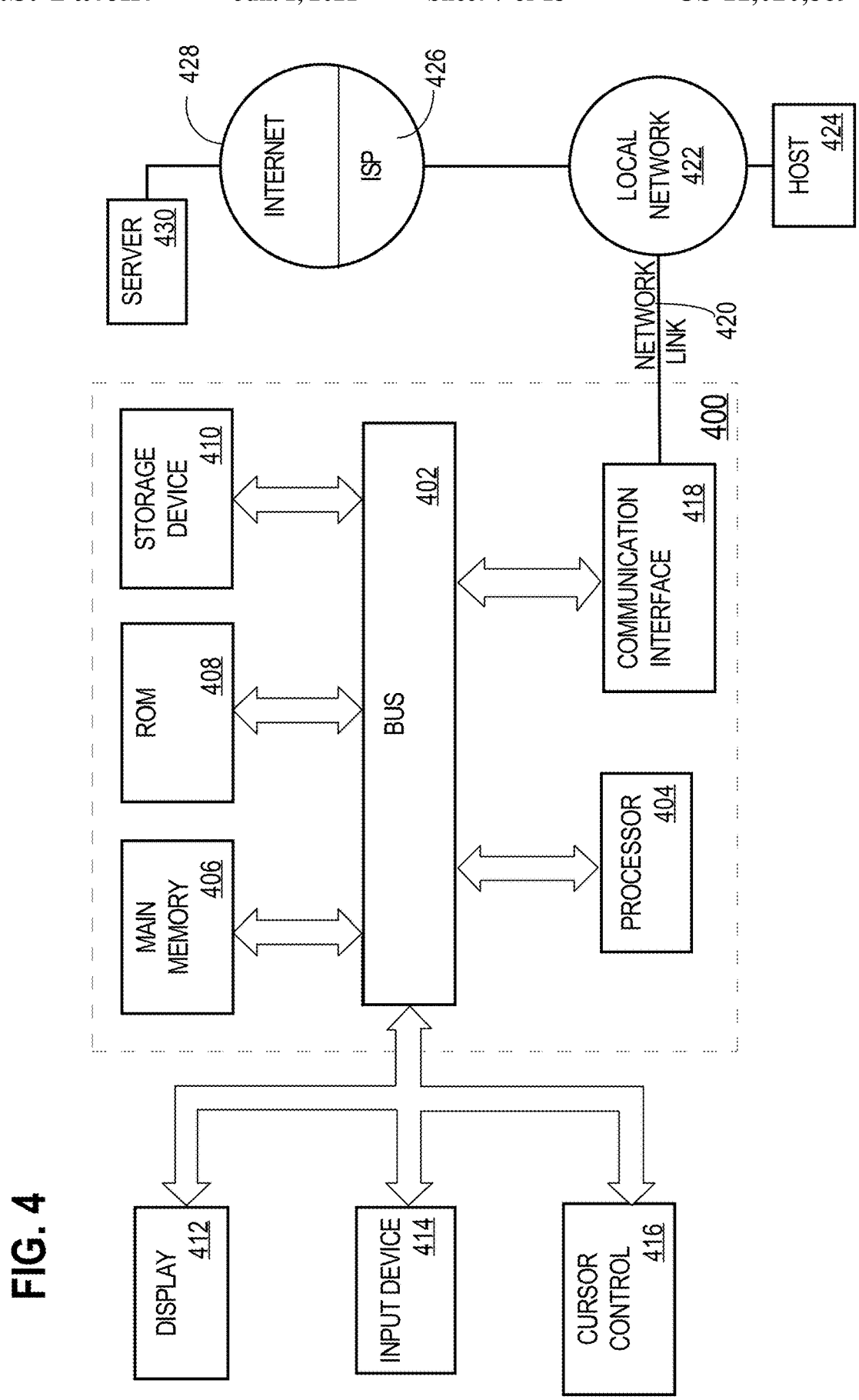

AUTOMATED APPLICATION OF CUT THERMAL ADHESIVE FILMS

BENEFIT CLAIM

This application claims the benefit under 35 U.S.C. § 120 as a continuation of application Ser. No. 16/201,803, filed Nov. 27, 2018, which is a continuation of application Ser. No. 15/072,169, filed Mar. 16, 2016, now U.S. Pat. No. 10,137,590, issued on Nov. 27, 2018, which claims the benefit under 35 U.S.C. 119(e) of provisional application 62/133,946, filed Mar. 16, 2015, the entire contents of which are hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

FIELD OF THE DISCLOSURE

The disclosure generally relates to methods of manufacturing products that are decorated with films, such as wearing apparel. The disclosure relates more specifically to computer-driven techniques for automatically applying cut thermal adhesive films to other products.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Plastic films with thermal adhesive backing are used for decorating a wide variety of materials and products. While these films are sometimes referred to as heat transfer vinyl, modern heat transfer films are usually manufactured from urethane, polyester, or polypropylene to avoid the toxicity of vinyl chloride when exposed to heat.

Cut thermal adhesive films are composed of at least two layers, the plastic substrate, and a thermal adhesive coating. The substrate often contains a colorant or additional decorative additive. The films are usually affixed to a backing paper or plastic substrate. Films of this type may be cut with a plotter/cutter machine so that regions of the film cut film may describe lettering or a decorative shape or image. Often the films are cut in a manner that leaves the backing film or paper intact. The type of cutting is called a 'kiss cut'.

After cutting, the portions of the film that do not include the lettering or shape to be transferred must be removed. The non-transferred portion of the film is called the 'negative area'. Removing the negative areas of the film for all but the simplest designs is performed by heat press operators as a manual process. The manual removal of negative areas of heat transfer films is called 'weeding'. After weeding, the positive areas of the film are transferred using a heat press to the surface of the material or product to be decorated.

The labor costs for weeding constrains the complexity of designs that may be used for decorating objects with heat transfer films. While there are other processes such as pad printing, screen printing, and direct inkjet printing that may easily handle complex designs, heat transfer films may be formulated to adhere to and decorate a much wider variety of materials and combination of materials found in products than other decorative printing processes. Heat transfer films may also be manufactured with metal films or flakes or be embossed to form other optically active surfaces.

Given the versatility of heat transfer films, it is useful to devise a system and method for the automated removal, or weeding, of the negative design areas prior to heat transfer that is integrated into the application of the cut thermal transfer film.

SUMMARY

The appended claims may serve as a summary of the invention.

BRIEF DESCRIPTION OF THE DRAWINGS

In the drawings:

FIG. 4 is a block diagram that illustrates a computer system upon which embodiments may be implemented.

DETAILED DESCRIPTION

Figure 1A:
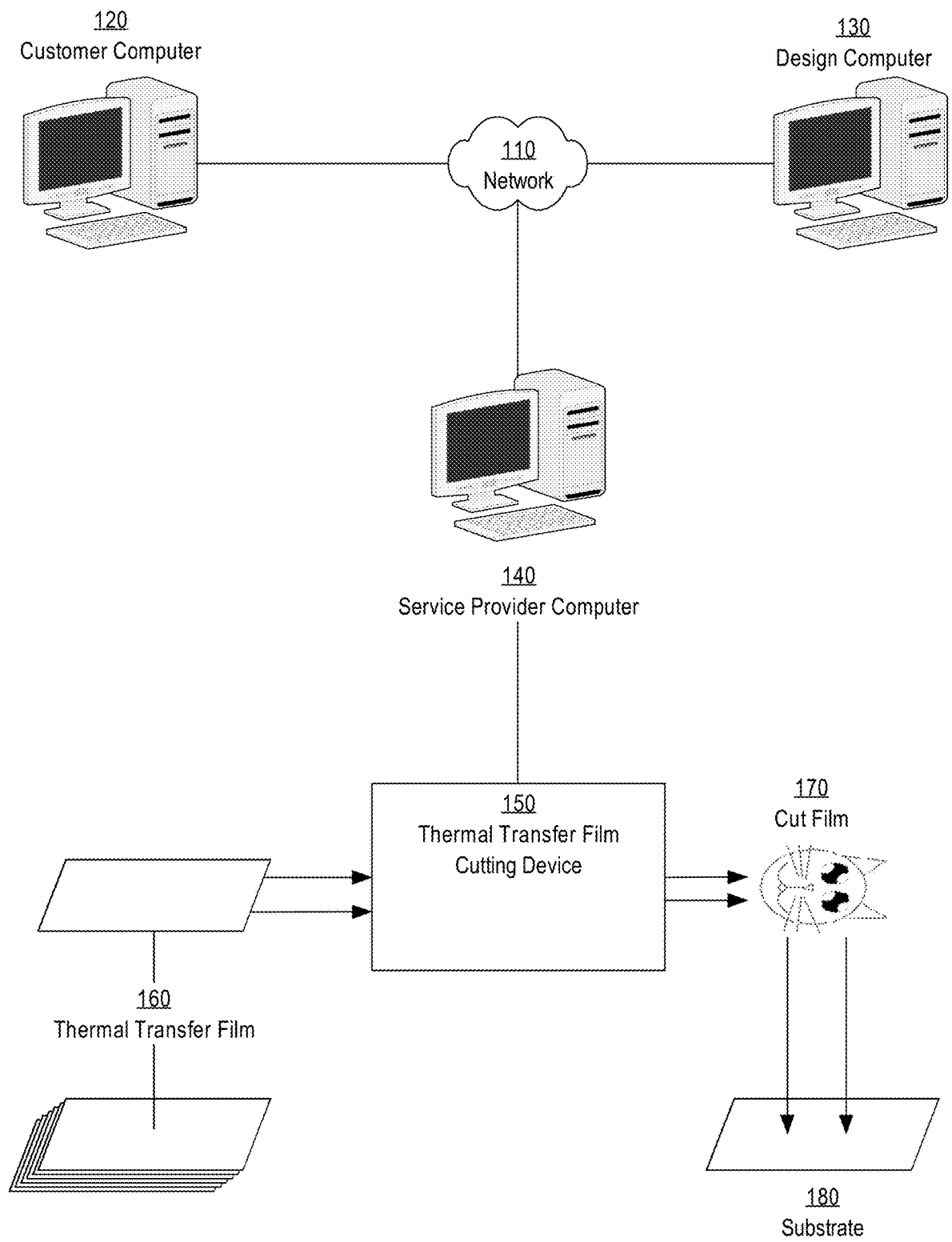
FIG. 1A is an example data flowchart depicting an infrastructure for automatically cutting a design on thermal transfer film using one or more computing devices.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1. GENERAL OVERVIEW

In an embodiment, a method of manufacturing a tangible substrate with a thermal film that is cut according to computer instructions comprises obtaining an input digital image of a design that is to be transferred to the tangible substrate and storing the input digital image in electronic digital memory of a computer; using the computer, rendering a plurality of design elements of the design as a single output image; using the computer and based upon the output image, a bleed size value, a maximum number of negative areas, a maximum number of positive areas, and one or more substrate attribute values: resizing the output image to include a border for bleed; filling all transparent areas of the output image with the one or more substrate attribute values; creating and storing a cutting path; creating and storing a mask image; digitally inverting the mask image in the memory; modifying the mask image to adjust one or more fill areas around one or more details, to limit negative areas to be less than the maximum number of negative areas, and to limit positive areas to be less than the maximum number of positive areas, resulting in a modified mask image; creating and storing cutting path data in the memory, comprising a vector path on an outline of the mask image; transmitting the cutting path data over a computer network.

In one feature, the output image includes alpha channel data, and wherein creating and storing a mask image comprises copying the alpha channel data to a one-channel image having a same size as the output image.

In another feature, the method comprises preprocessing the plurality of design elements of the input digital image by one or more of: creating alpha channel data for the input digital image when the input digital image lacks alpha channel data; for each of one or more text elements in the input digital image, creating a background balloon having a color, texture or pattern that corresponds to the substrate.

In yet another feature, the method further comprises copying the mask image in memory to create a one-channel fill image of a same size as the mask image; based on a fill size value and a pixels-per-inch value, shrinking a fill image size of the fill image by a product of the fill size value and pixels-per-inch value, and growing the fill image size of the fill image by a product of the fill size value and pixels-per-inch value; setting each pixel in the mask image to a lesser value of a mask image pixel value and a fill image pixel value, resulting in modified mask image data for an opaque region that covers all the design including fine details.

In a further feature, the one or more substrate attribute values comprise any one or more of color, texture and pattern of the substrate.

In still another feature, the method further comprises using the cutting path data, driving a cutting machine to cut a thermal transfer film; removing selected image area from the thermal transfer film; heat transferring the thermal transfer film to the substrate.

In yet another feature, the method further comprises using the cutting path data, driving a cutting machine to cut a film on a backing sheet to describe a decorative design and to provide a registration means; attaching a film portion corresponding to unused portions of the design to a receiving sheet using the registration means and an attachment means; removing the film portion corresponding to the unused portions of the design from the backing sheet using the receiving sheet; attaching a second film portion corresponding to remaining portions of the design on the backing sheet to the substrate.

In various other features, the cutting means and the attachment means are automated by a positioning means and a motion control means; the motion control means and the positioning means are controlled by a series of instructions; a second series of instructions for motion control of the attachment means is derived from the cutting path data.

In still another feature, the method further comprises using the cutting path data, driving a cutting means to cut a thermal adhesive film on a backing sheet to describe a decorative design and to provide a registration means; attaching unused portions of the film to a receiving sheet using a registration means and a thermal attachment means; removing the unused portions of the film from the backing sheet using the receiving sheet; attaching remaining portions of the film to the substrate.

In various approaches, the cutting means and the attachment means are automated by a positioning means and a motion control means; the motion control means and the positioning means are controlled by a series of instructions; a second series of instructions for motion control of the attachment means is derived from the cutting path data.

In some embodiments, the substrate comprises an article of wearing apparel. Examples include hats, shirts, jackets, sweatshirts and pants. In other embodiments, the substrate may comprise other natural or synthetic textile or non-textile items such as bags, totes, cases, etc.

2. FOUNDATION TECHNOLOGY 2.1 ACTAF Disclosure. Prior U.S. patent application Ser. No. 14/671,598, filed Mar. 27, 2015, which claims priority to provisional application 61/972,178, filed Mar. 28, 2014, describes a system and method for automated application of cut thermal adhesive films internally denoted ACTAF, and to the maximum extent permitted under national law, the entire contents are hereby incorporated by reference as if fully set forth herein. The ACTAF disclosure also is set forth in the APPENDIX.

2.2 Laser Weeding. The automated removal of negative design areas may be performed by laser ablation. Laser ablation is a process by which a portion of a material is removed by rapidly heating with light from a laser so that portion of the material in converted directly from a solid to gas. Using laser cutting and ablation to cut and remove material from heat transfer films is a well-known process, and the manufacture and use of specialty films for laser cut transfer are protected by patent. The heat transfer film is manufactured so that its transfer characteristics are preserved and is designed to minimize the toxicity of the gas resulting from laser ablation. Films with large variation in surface thickness may be difficult to process. The reflective properties of the film must be designed so that laser ablation may take place. Many Metallic and Holographic films are difficult or impossible to weed in this manner. Laser ablation requires that the full negative area be traversed, rather than just the cut edge. This can greatly increase the cutting time for processing thermal transfer films. Laser weeding of thermal transfer films is well suited to transferring small complex designs using a constrained set of colors and surfaces.

2.3 Selective Thermal Transfer. The pigmented film may be designed so that it separates well when part of it is transferred to a substrate by selective heat application. Many printing processes transfer pigmented waxes or thermoplastics from a carrier sheet or ribbon onto a substrate. Specialty thermal transfer sheets may be manufactured with transferable dots, segments or regions. These processes impose limits on the variety of optical effects and durability of the material that is transferred. These processes may also result in a broken or approximate edge for the transferred design. While heat presses may be built to conform to a variety of surface shapes and curvatures, building a machine for selective application of heat transfer for a custom shape or surface may be prohibitively expensive.

2.4 Masked Thermal Transfer. Some transfer processes use a mask to block transfer of negative design areas. These processes have many of the same features of selective thermal transfer processes, and also require the production or printing of a mask.

While each of these methods provides automated removal or masking of the transfer of negative design areas, each is limited it the type of material that may be transferred. Embodiments of the processes disclosed herein may be used with a broad range of thermal transfer films, may use existing film types and cutting equipment, and may be inserted into existing manufacturing flows.

3. PROCESS OVERVIEW

This disclosure assumes familiarity with U.S. Pat. Nos. 8,174,521; 8,175,931; and application Ser. No. 12/790,711, filed May 28, 2010, the entire contents of which are hereby incorporated by reference for all purposes as if fully set forth herein. These disclosures generally relate to computer-implemented systems that are programmed or configured to operate in connection with a service provider who receives orders for customized products and then either directly fulfills the orders or brokers or provides them to external makers or custom manufacturers. Some of the customized products may involve printing a graphical design or image on a tangible product; examples include apparel, bags, hats and the like. The images original from electronic digital graphical images that are originally authored using computer-based image design programs, CAD systems, or other art production systems. Printing on the products may use thermal transfer techniques as described herein.

3.1 ACTAF Technique

A system and method disclosed herein for automated Application of Cut Thermal Adhesive Films will be called ACTAF for brevity. Cut Thermal Transfer Films will be called CTTF for brevity. Other processes for manufacturing, cutting and transferring CTTFs are well developed. Since these technologies work well, and are relatively inexpensive, it is beneficial to use these existing materials and processes in some aspects of the present disclosure. ACTAF is designed to be inserted in the weeding step in the manufacturing flow for decorating products by applying CTTFs. ACTAF is designed to use existing off-the-shelf components when possible.

In an embodiment, specific steps to decorate a product using CTTFs and ACTAF comprise:

1. Read file or instructions that describe regions to be cut using an existing plotter/cutter device.
2. Generate additional instructions for ACTAF.
3. Add additional registration means for ACTAF to the instructions for the plotter/cutter.
4. Cut the CTTF using the instructions from step 3, and the plotter/cutter device.
5. Register the CTTF on the ACTAF device using the registration means.
6. Register a receiver sheet on the ACTAF device, note that the receiver sheet may already be part of the CTTF.
7. Use the ACTAF device and the instructions generated in step 2 to selectively attach the negative design areas of CTTF to a receiver sheet.
8. Remove the receiver sheet and the attached negative design areas from the CTTF in one step, thereby concurrently achieving weeding.
9. Place the CTTF on the product or substrate to be decorated.
10. Transfer the positive design areas of the CTTF to the product or substrate using a heat press device.

Before reviewing the steps in detail, it is useful to describe an embodiment of a device which may be used for ACTAF.

3.1.1 The ACTAF Device. The ACTAF device needs to be able to apply selective heat and pressure to specific points and paths to attach the negative design area portions of the CTTF to the receiver sheet. As noted in the steps, depending on the type of CTTF, the thermal adhesive portion of the film may be positioned facing the backing sheet for the CTTF or facing away. If the adhesive portion of the CTTF faces away from the backing sheet, a separate receiver sheet will be used. The ACTAF device may be composed of the following means:

3.1.1.1 Registration Means. The ATCIF device needs a surface to hold the cut CTTF and receiver sheet firmly in a known position that is registered to the cutting performed by the plotter cutter. In one embodiment this is a flat aluminum platen with registration pins that match a hole cut through the CTTF by the plotter/cutter as directed by step 2 above. Additionally, the registration means may have a cut channel that is bigger than the maximum size of the CTTF to be processed, but smaller than the receiver sheet, or a flexible sheet framing the cut area. Additionally, the cut channel may be used to draw the CTTF onto the platen by applying a vacuum to the cut channel. In another embodiment, the Registration means is a set of rollers that hold the CTTF against a platen, and which determines the position of the CTTF by optically detecting holes in the CTTF cut through the CTTF by the plotter/cutter as directed by step 2.

3.1.1.2 Thermal Point Source Means. The ACTAF device needs a means to attach the thermal adhesive on the negative design areas for the CTTF to the receiver sheet. In many embodiments this is a thermal point source. The thermal point source may be a heat conductive material, such as copper, shaped to have a smooth point. Heat may be applied to the copper point using heat generated by electrical resistance. Additionally, there may be a heat sensor which measures the heat of the Thermal Point Source Means. Additionally, there may be a means to set and maintain the temperature of the Thermal Point Source Means at a given temperature. Additionally, that temperature may be set to the temperature needed to attach the CTTF thermal adhesive to the receiver sheet within a set distance from the center of the Thermal Point Source Means.

3.1.1.3 Positioning Means. The ACTAF device needs a means to position Thermal Point Source Means at a specific location on the CTTF as it is held on the Registration Means. It will also need a means to apply a known force or pressure to the CTTF at a specific point. In one embodiment the positioning means is an X, Y, Z gantry with servo motors, such as those used for positioning routers or drills. In another embodiment, the Positioning means is a set of rollers to move the CTTF relative to the Thermal Point Source Means in the Y direction, a Carriage to move the Thermal Point Source Means relative to the CTTF in the X direction, and a servo mechanism to move the Thermal Point Source Means relative to the CTTF in the Z direction and to apply pressure. Additionally, in some embodiments, the pressure or force that the Thermal Point Source Means applies to the CTTF may be adjusted limited or modified by being held in place by a spring and a means to adjust the spring.

3.1.1.4 Motion Control Means. The ACTAF device needs a Motion Control Means to convert the instructions for where to attach the negative design areas of the CTTF to the receiver sheet to control inputs to the Positioning means. In some embodiments it controls the inputs to the Thermal Point Source Means to change the size of region that may be attached to the receiver sheet, or to control heat needed for rapid motion of the Thermal Point Source traversing the CTTF. This Motion Control Means may be a microcontroller contained in a device such as the X, Y, Z gantry robot described as the positioning means. The instructions the microcontroller accepts may be a standard Numerical Control language such as G-Code.

3.1.2 ACTAF—Detailed Description of Specific Steps

Generating Instructions for ACTAF. In some embodiments, the instructions for ACTAF consist of G-Code statements. G-Code is a language for numerical control of (among many others) NC drilling machines and routers. It consists of statements directing the motion of the machine in 3 dimensions. Through these commands, the machine may trace a path with a known tolerance. In some embodiments, software is used to generate the cut path for the plotter/cutter, and the paths for the ACTAF device. The path generated for the ACTAF, while it may use the same vector input as the cut path, must be modified for ACTAFs task.

Thermal Attachment Resolution. The ACTAF device applies heat to a specific area on the CTTF. There must be enough heat to firmly attach the film to the receiver sheet, but not so much heat that an adjacent positive region is also attached. This constraint imposes a distance or attachment resolution based on the qualities of the CTTF. In some embodiments, with some CTTF types, this resolution is about 0.5 millimeters.

Minimum attachment Point. The minimum width of a negative design region to be attached is 2× the Thermal Resolution. In the embodiment and the CTTF cited above, this would be 1.0 millimeter. In the case of a 1.0-millimeter dot, a single point application of the Thermal Point Source would attach this region.

Minimum Tear Span. Some CTTFs regions will pull away with only attachment at the edge. Others will tear based on the pull of the CTTF's attachment to its backing film. The maximum distance between attachment points that will not tear is called the minimum tear span. It is useful to know this for a CTTF, since it minimizes the time it takes for the ACTAF to attach the negative design areas.

Path Inset. To generate a tacking path for a single negative design region, the instruction generating software will need to inset the design path by the Thermal Resolution distance. Within this inset, the software will need to add paths to avoid tearing using the Minimum Tear Span.

3.1.3 Processing Instructions for ACTAF

In some embodiments, the ACTAF device processes a standard language, such as G-Code, for numerical control that drives the positioning and application of pressure. In other embodiments the ACTAF device may receive the same files that are processed by the plotter/cutter or a RIP, such as a PDF file, and a processor in the device generates the instructions for Motion control as described above in 'Generating Instructions for ACTAF' within the device itself. In some embodiments additional controllers may adjust temperature and pressure of the Thermal Point Source in response to temperature and force sensing attached to the Positioning Means and the Thermal Point Source.

3.1.4 Weeding and Transfer

In many embodiments, a CTTF is used which has the thermal adhesive facing away from the backing sheet. For these embodiments, a receiver sheet is cut or punched to match the registration means of the ACTAF. The negative design areas are attached to the receiver sheet by the ACTAF, and then the receiver sheet is removed from the CTTF, along with the attached negative design areas. The CTTF with Backing paper and the positive design areas is positioned on a substrate or product. The resulting sandwich is heat pressed, and the backing sheet is removed.

In some embodiments, a CTTF is used which accepts inkjet printing. In some of these films the backing sheet for the CTTF will not accept thermal attachment to the negative areas of the design; these films are processed by the ACTAF to attach the printed side of the negative areas to a registered receiver sheet coated with a thermal adhesive. The negative design areas are attached to the receiver sheet by the ACTAF, and then the receiver sheet is removed from the CTTF, along with the attached negative design areas. The printed side of the CTTF with backing paper and the printed positive design areas is then covered with a transfer sheet which is coated with repositionable adhesive. The transfer sheet is pressed so that it adheres firmly to the CTTF. The transfer sheet is then separated from the backing sheet. The transfer sheet is used to position the positive design of the CTTF film on a substrate or product. The resulting sandwich is heat pressed, and the transfer sheet is removed.

3.2 Flex-Flock Processing Techniques

The inventors, in an inventive moment, discovered that the following process may be effectively used to generate data that can drive cutting equipment for use in flex and flock transfer printing. Flex and flock transfer printing is often used for prints containing 1 to 3 colors and for small production runs, such as up to 50-100 units. Flex and flock transfer printing is suitable for text prints, simple logos, symbols and print elements drawn in vector graphics. The print is created by cutting out elements from a special material and melting them with the garments using a heat press. The process can be used to produce prints with a smooth surface, reflective surface, velvet service, glow-in-the-dark effects, glittering prints, etc. The technology can be used to print on garments, and also to print on large-scale fabric surfaces such as cloth curtains, roller blinds, flags and others. Most commonly it is used for printing on promotional products such as jackets, umbrellas, bags, sportswear etc.

In one embodiment, the processing steps shown in TABLE 1 are used. In an embodiment, the algorithm described in this section may be used as a basis for programming a computer to receive, transform, and store electronic digital data representing both a cutting path for computer-driven cutting machinery, and a printed design for computer-driven printing equipment.

TABLE 1

EXAMPLE PROCESSING STEPS

| | |
|---|---|
| 1. | Preprocess design elements. Images are converted to a high contrast monochrome mask. Text is rendered as a high contrast monochrome mask. The design elements then are rendered as a single MaskImage. |
| 2. | Process MaskImage for display or print. Input parameters include: MaskImage, a high contrast monochrome mask. NegativeSize, the minimum dimension, in inches, that may be cut as a negative area |

TABLE 1-continued

EXAMPLE PROCESSING STEPS

PositiveSize, the minimum dimension, in inches, that may be cut as a positive area
SamplePPI, the pixels per inch of the output image.
MaximumNegativeRegions, the maximum number of negative areas allowed
MaximumPositiveRegions, the maximum number of positive areas allowed
2.1      Build the Cut path
         2.1.1      Filter for Size
                 2.1.1.1      Shrink MaskImage by (PositiveSize*0.25 * iSamplePPI)pixels.
                 2.1.1.2      Grow MaskImage by ((PositiveSize*0.5 + NegativeSize*0.5) * iSamplePPI)
                 2.1.1.3      Shrink MaskImage by (NegativeSize*0.5 * iSamplePPI)pixels.
         2.1.2      Filter to limit negative areas (reduce number of areas to weed)
                 2.1.2.1      Invert the MaskImage (pixel = 1.0-pixel)
                 2.1.2.2      Add each positive region in the image to a list called the RegionList
                 2.1.2.3      Sort the RegionList by region area, largest to smallest.
                 2.1.2.4      Limit the count of the RegionList to MaximumNegativeRegions.
                 2.1.2.5      Render the RegionList to the MaskImage.
                 2.1.2.6      Invert the MaskImage (pixel = 1.0-pixel)
         2.1.3      Filter to limit positive areas
                 2.1.3.1      Add each positive region in the image to a list called the RegionList
                 2.1.3.2      Sort the RegionList by region area, largest to smallest.
                 2.1.3.3      Limit the count of the RegionList to MaximumPositiveRegions.
                 2.1.3.4      Render the RegionList to the MaskImage.
         2.1.4      Convert the MaskImage outline to a vector path called the CutPath
         2.1.5      Dispose of MaskImage
Return the CutPath

3.3 CAD-Cut Processing Techniques

In CAD-Cut thermal transfer, a thermal transfer film is first printed, typically based upon a design or image that is initially created using a computer-aided design (CAD) system. After printing, the printed thermal transfer film is tacked to a backing sheet and then cut. A transfer sheet is attached. Selected image area is removed, and the transfer sheet then is used to heat transfer the film to the substrate.

4. DETAILED DESCRIPTION OF EXAMPLE ALGORITHM

In an embodiment, the algorithm shown in TABLE 1 and further described in this section may be used as a basis for programming a computer to receive, transform, and store electronic digital data representing a cutting path for computer-driven cutting machinery for use with CAD-Cut thermal transfer film, based upon a CAD design intended for use with computer-driven printing equipment to print on the film. In other words, the design has been previously created and is received in digital electronic form as a vector image, or a combination of a vector image and text, and the algorithm herein is used to define the cut region or cutting path. In an embodiment, the algorithm described in this section may be used as a basis for programming a computer to receive, transform, and store electronic digital data representing preview images for online display to designers as further described.

The algorithm is useful with any image-text combination that can be separated into a positive region for transfer to a substrate and a negative region that is not transferred. In general, in an embodiment, the algorithm is configured to filter the input image to identify and fill in around areas that otherwise would be too small to cut around and transfer. Further, the algorithm is configured to limit the total number of positive areas and negative areas so that total processing time using the cutting equipment will be reasonable for commercial production with reasonable throughput of customer orders. In other words, while a design could be arbitrarily complex, there is a commercial desire to limit the amount of time involved in cutting the design and weeding the negative areas prior to transfer.

The following discussion follows the outline of steps shown in TABLE 1.

1. Preprocess the design elements. For received images, create an alpha channel. If an alpha channel is already present it may be used, or it may be synthesized by various means if it is missing with the goal of finding the main perimeter edge of the image. For example, in one synthesis approach, every pixel that is connected to a background color is identified and used as the alpha channel, or all white large areas are identified. The background may be identified by seeking large groups of contiguous similarly colored pixels while leaving the internal shapes unaffected. For text, create a background 'balloon' with the color, texture, and/or pattern of the substrate. Various statistical techniques may be used to detect text within an image.

As detailed in subsequent steps, to make the image easier to weed, ultimately all areas that are transparent or in the alpha channel are colored with the substrate color. The result is a reasonable border around the image as well as coloration of internal areas with the substrate color so that they blend in with the substrate and appear transparent or in the background as intended by the designer. The substrate is the product or material to be decorated.

Statistical analysis of image data may be used in these steps to improve results. For example, use of the white pixel detection process noted above may be used only for regions that appear to represent image edges so that elements such as white portions of character eyes are not designated as transparent and changed to the substrate color. Counting the number of positive image areas and negative image areas, for a known two-color image, may be used to determine that a particular region likely includes text so that attempting to transform it to the substrate color should be done. Alternatively, statistical analysis may indicate that the number of white areas is so large that they probably do not represent transparent areas so that transformation to the substrate color should not be done; examples would be design elements containing groups of white dots, rows of stars and the like. White areas that should be transparent typically would be expected to be smaller in number.

Figure 5:
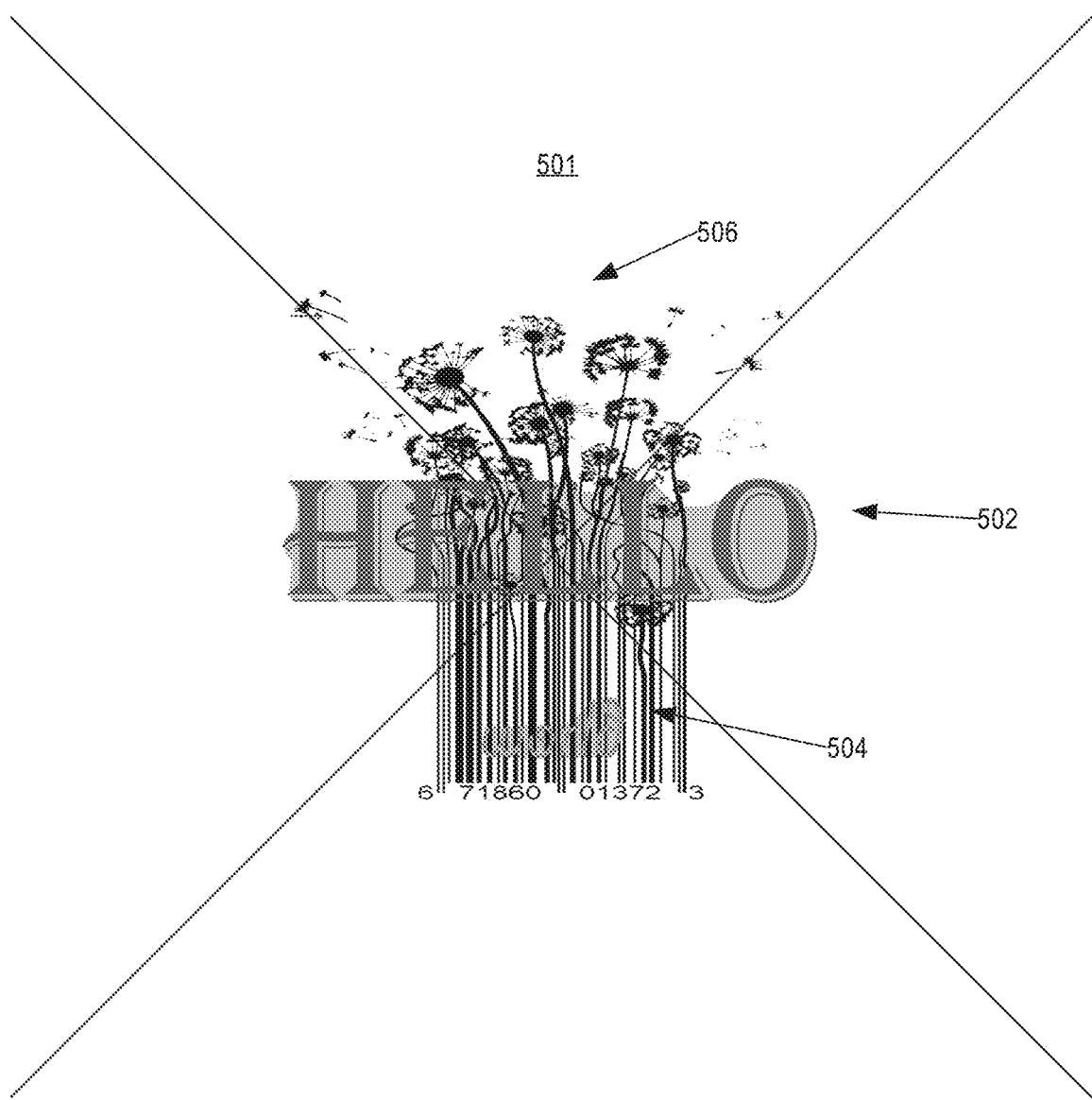
FIG. 5 illustrates an example design in which all elements have been rendered as a single output with alpha channel.

2. Render the design elements as a single OutputImage with alpha channel. FIG. 5 illustrates an example design in which all elements have been rendered as a single output with alpha channel. In an embodiment, an output design image 501 comprises text elements 502, 504, each of which has been rendered using a background balloon that logically surrounds and bridges text characters. The text is "HELLO world", but background color shading has been computed and attached to the text characters as seen in FIG. 5. A plurality of other design elements 106 are present, many of which have detail that is too fine to be the subject of a cut piece of thermal transfer film.

3. Process the OutputImage for display or print using the following sub process. The input parameters comprise:

OutputImage, an color image with an alpha channel

FillSize, the minimum dimension, in inches, that may be cut as a negative area. This parameter is based upon the capabilities and tolerances of the computer-driven cutting equipment that is to be used, including error margins or error tolerances and to ensure that elements such as text are not subject to weeding in areas of fine detail.

SamplePPI, the pixels per inch of the output image.

BleedSize, the registration tolerance of cut process aligned with the print process MaximumNegativeRegions, the maximum number of negative areas allowed MaximumPositiveRegions, the maximum number of positive areas allowed The Maximum Regions parameters enforce the limitations described above to provide for reasonable throughput.

3.1 Resize the output image to have a border for bleed, which is the tolerance needed for the image areas to overprint the cut line. Sub steps include:

Fill the bleed border with transparent white

Fill the transparent areas of the image with the substrate color, texture, and/or pattern Build the Cut path 3.2 Copy the alpha channel or transparency mask to a new, 1 channel image of the same size as the output image, this is called the MaskImage.

Figure 6:
FIG. 6 illustrates the design of FIG. 5 in which digital inversion has been applied.
Figure 7:
FIG. 7 illustrates a rendering of the design of FIG. 6 in which a first-level growth step has been applied.

3.3 Digitally invert the MaskImage such that each value of a pixel=1.0-pixel value. FIG. 6 illustrates a rendering of the design of FIG. 5 in which digital inversion has been applied. As a result, in inverted design 601 of FIG. 6 certain design elements such as color text 602, 604 would appear as solid black fields if rendered.

In an embodiment, the algorithm herein is implemented using application programs of a service provider that collects designs from designers, collects orders from customers, and acts as a fulfillment house for custom manufactured products that the customers may order based on the designs. The Zazzle service, commercially available from Zazzle, Inc., Redwood City, Calif., is an example of such a service provider. In such a system, designers may be given access to online computer programs or applications that permit uploading new designs and previewing the appearance of those designs in the manufacturing process before the designs are committed or released to the service provider for use in actual customer orders.

Figure 10:
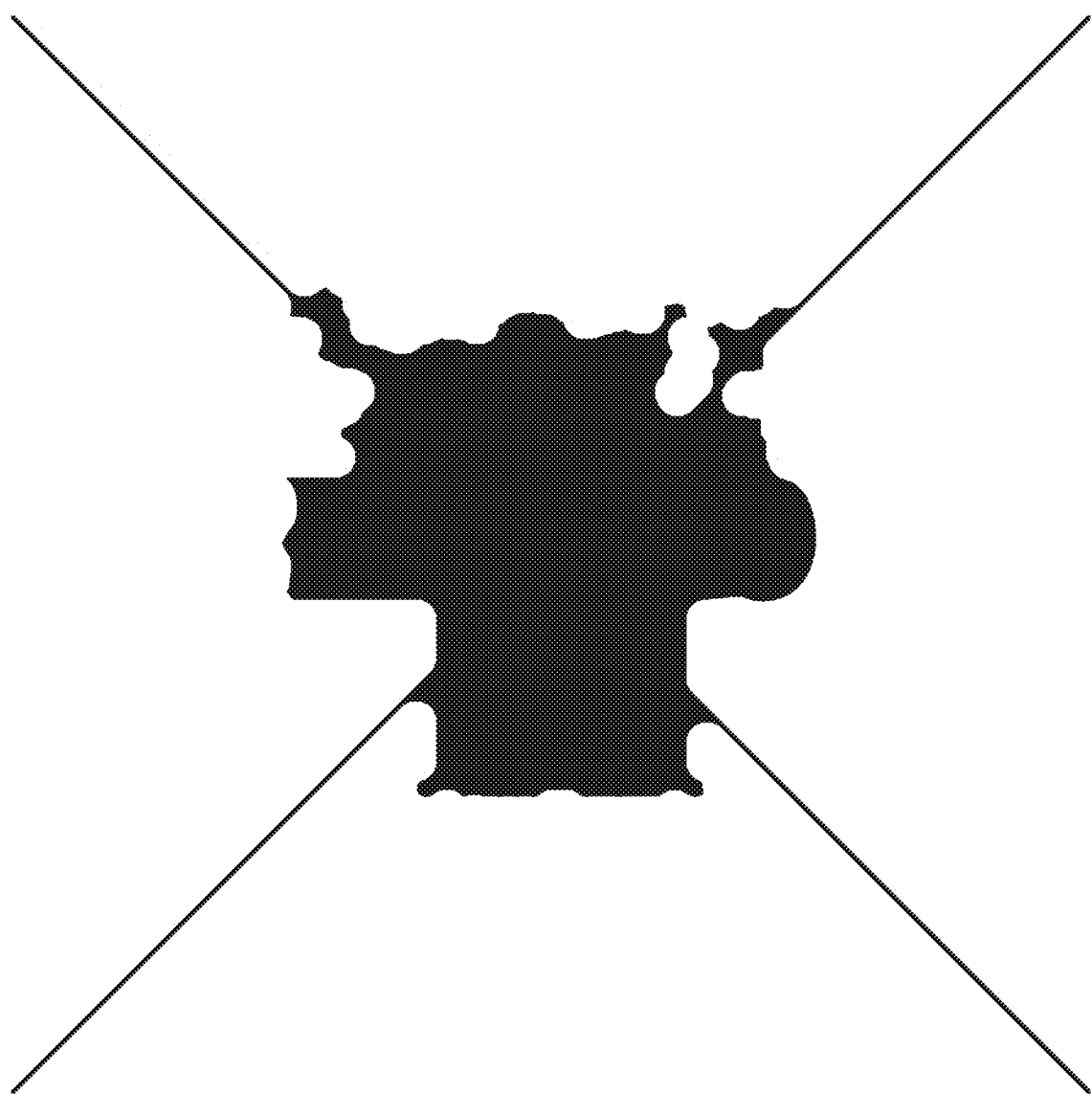
FIG. 10 illustrates an example in which a BorderList has been rendered to a MaskImage, as defined in the description.
Figure 11:
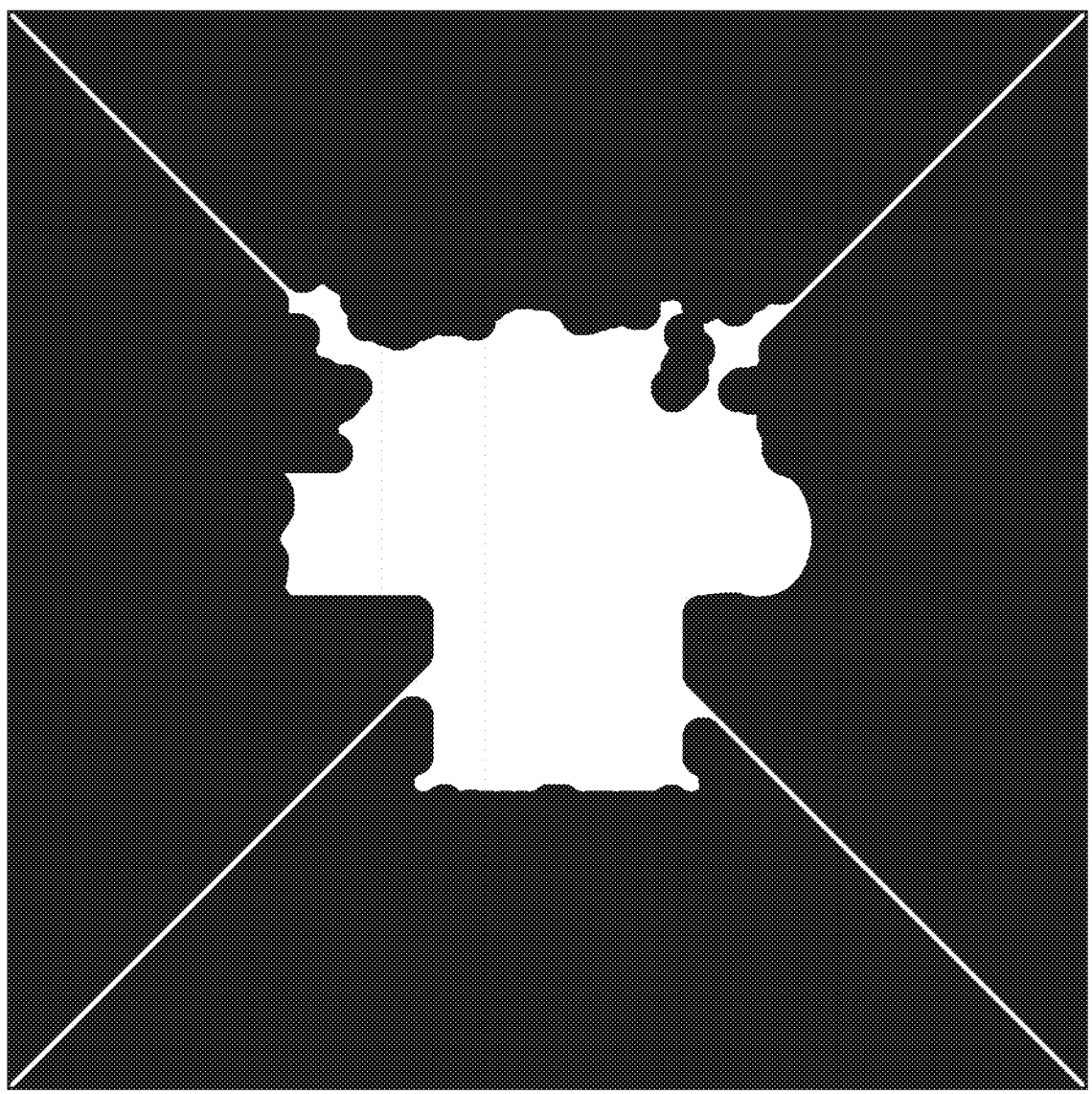
FIG. 11 illustrates an example of the result of an inversion step.

Thus FIG. 6, and the other drawing figures herein through FIG. 11, may represent example images that could be rendered in an online application of the service provider, and available to the designers, to enable the designers to view the appearance of designs as they will be cut and applied to products. The views of FIG. 6 to FIG. 11, inclusive, could be available for display selectively by designers to preview the appearance of their designs in the rendering and cutting process that the manufacturer will use, before the designers release or commit the designs to the manufacturer. In some embodiments, the images may be rendered in a lower-resolution for on-screen previewing purposes with designers, and in high-resolution versions for use in instructing printers or cutters. Each image shown herein also may be transformed, using known processes, into machine instructions to drive the RIPS printers and/or plotter-cutters and therefore the images shown in the drawing figures should be considered representative of those instructions.

3.4 Filter for FillSize. Sub steps include:

Copy the MaskImage into a new 1 channel image of the same size called the FillImage.

Shrink the FillImage by the FillSize*SamplePPI pixels.

Grow the FillImage by the FillSize*SamplePPI pixels. FIG. 3 illustrates a rendering of the design of FIG. 6 in which this first-level growth step has been applied.

Figure 8:
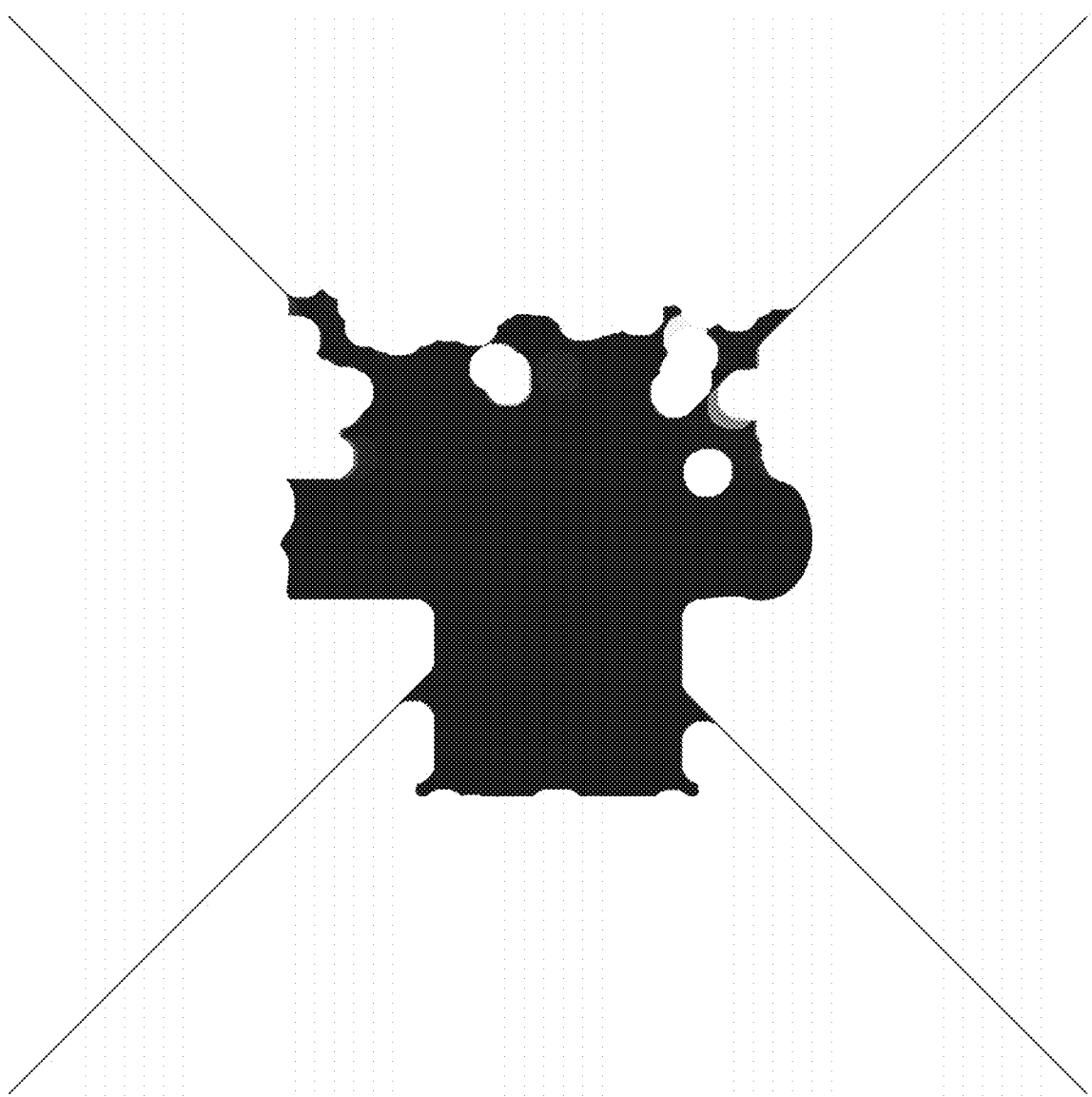
FIG. 8 illustrates a rendering of the design of FIG. 7 in which a setting step has been performed.

Set each of the MaskImage pixels to the lesser value of MaskImage pixel and the FillImage pixel. FIG. 8 illustrates a rendering of the design of FIG. 7 in which this setting step has been performed. As a result, if the image is rendered, then design 802 comprises a large opaque region 804 that conceptually covers all parts of the original design including fine details. This step ensures that sufficient fill area exists around fine details to permit physical cutting by the cutting equipment, and to account for cutting tolerances and errors inherent in the cutting equipment, as well as to reduce the likelihood of tearing the positive design regions when tearing is performed.

Dispose of FillImage

Apply Bleed

Figure 9:
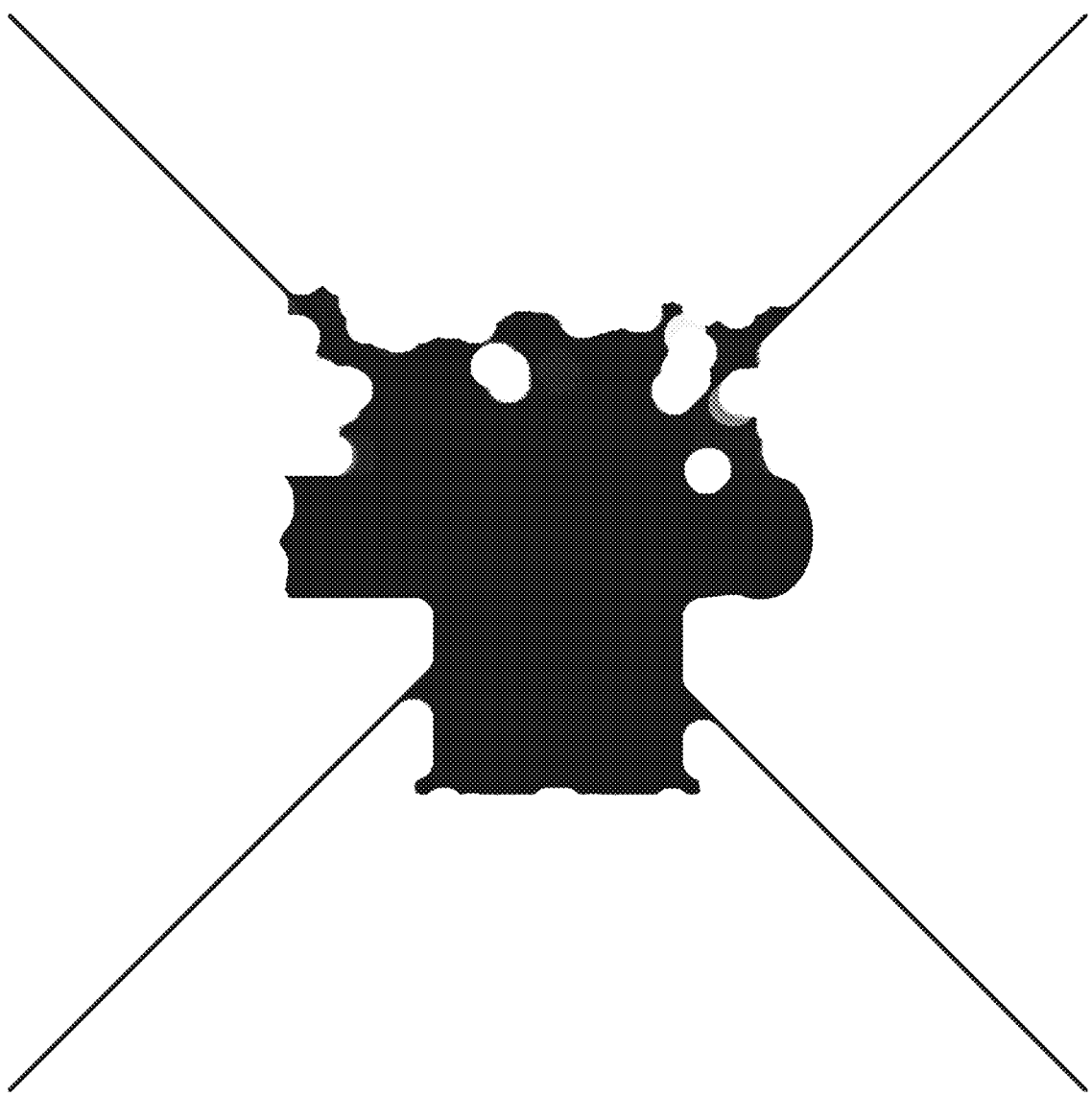
FIG. 9 illustrates an example of the result of growing the image.

Grow the FillImage by the BleedSize*SamplePPI pixels. FIG. 9 illustrates an example of the result of growing the image using this step. In the grown design 902 of FIG. 9, it may be seen for example that growth results in a thicker appearance of lines 806 of FIG. 8 in the form of thicker lines 906 in FIG. 9.

Filter to limit negative areas. This effectively reduces the number of areas to weed and simplifies the task of determining what parts of the backing to remove at the time of weeding. In practice, the inventors have found that a time to weed of greater than five minutes is undesirable in a production environment because the cutting equipment typically requires five minutes or less to cut a piece of film for the typical design. Therefore, a weeding time of longer than five minutes would begin to affect throughput time. Sub steps include:

Invert the MaskImage (pixel=1.0-pixel)

Add each positive region in the image to a list called the RegionList

Add each positive region in the RegionList that borders the image edge to a list called the BorderList.

Sort the BorderList by region area, largest to smallest.

Limit the count of the BorderList to MaximumNegativeRegions.

Render the BorderList to the MaskImage. FIG. 10 illustrates an example in which the BorderList has been rendered to the MaskImage. One result is that various inclusions 908 of the design of FIG. 9 are filled, as seen in design 1002 of FIG. 10.

Invert the MaskImage (pixel=1.0-pixel). FIG. 11 illustrates an example of the result of this inversion step.

Filter to limit positive areas Sub steps include:
 Add each positive region in the image to a list called the RegionList
 Sort the RegionList by region area, largest to smallest.
 Limit the count of the RegionList to MaximumPositiveRegions.
 Render the RegionList to the MaskImage.

Convert the MaskImage outline to a vector path called the CutPath

Dispose of MaskImage

Return the CutPath.

Return the OutputImage.

At this point the CutPath may be used as a cutting guide to drive cutting equipment of the type described above for thermal transfer material.

The OutputImage represents the final design including positive and negative areas and may be output to end users in digital electronic form, such as in a PDF file, or printed in hard copy form. In any of these forms, the OutputImage may serve as a guide for personnel who are performing weeding of negative areas of printed thermal transfer material, or as a finished product guide for people who are performing quality control checks on manufactured items.

Figure 12:
FIG. 12 illustrates an example of both a final CutPath and OutputImage.

FIG. 12 illustrates an example of both final CutPath and OutputImage. FIG. 12 may be rendered as a PDF file as noted above for guidance purposes. In the example design 1202 of FIG. 12, it will be seen that an irregular region 1204 having a color corresponding to the substrate has been constructed around all areas of the design, including fine printed details 506 and text 502, 504. The region 1204 in effect represents a minimum area of material that can be cut using available cutting equipment and applied to the substrate with simple weeding of the cut thermal material, while preserving all fine printed details of the design and without excessive or wasted thermal material surrounding the design.

The technique disclosed herein offers the benefit of greatly simplifying the weeding process for personnel who are engaged in the business of separating the cut thermal transfer material from backing material and applying the separated material and its adhesive to the substrate for subsequent thermal bonding. The weeding process does not require detailed picking away of backing material around complex design areas but can be accomplished in seconds instead.

All the approaches herein may be used in combination. For example, the CAD-Cut process might be effectively applied to a process, but a designer or manufacturing representative might decide that certain areas that have been designated with the substrate color ought to be removed. An example would be where the substrate has a texture that does not closely match the smooth film that will be applied over it, so that film in the color of the substrate does not look like the substrate due to the texture of the actual substrate. In that case, the manufacturer or designer may wish to use the CAD-Cut process in combination with the ACTAF process or Flex-Flock process previously described.

5. APPENDIX—ACTAF DISCLOSURE

The present disclosure generally relates to computer systems used to control a specialized device for cutting thermal adhesive films. The disclosure specifically relates to computer systems that are programmed to generate cutting and attachment instructions for a thermal transfer film cutting device.

BACKGROUND The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Plastic films with thermal adhesive backings are used for decorating a wide variety of materials and products. While these films are sometimes referred to as heat transfer vinyl, modern heat transfer films are usually manufactured from urethane, polyester, or polypropylene to avoid the toxicity of vinyl chloride when exposed to heat.

Cut thermal adhesive films are composed of at least two layers, the plastic substrate, and a thermal adhesive coating. The substrate often contains a colorant or additional decorative additive. The films are usually affixed to a backing paper or plastic substrate. Films of this type may be cut with a plotter/cutter machine so that regions of the cut film may describe lettering or a decorative shape or image. Often the films are cut in a manner that leaves the backing film or paper intact. The type of cutting is called a 'kiss cut'.

After cutting, the portions of the film that do not include the lettering or shape to be transferred must be removed. The non-transferred portion of the film is called the 'negative area'. Removing the negative areas of the film for all but the simplest designs is performed by heat press operators as a manual process. The manual removal of negative areas of heat transfer films is called 'weeding'. After weeding, the positive areas of the film are transferred using a heat press to the surface of the material or product to be decorated.

The labor costs for weeding constrains the complexity of designs that may be used for decorating objects with heat transfer films. While there are other processes such as pad printing, screen printing, and direct inkjet printing that may easily handle complex designs, heat transfer films may be formulated to adhere to and decorate a much wider variety of materials and combination of materials found in products than other decorative printing processes. Heat transfer films may also be manufactured with metal films or flakes or be embossed to form other optically active surfaces.

While automated processes exist for selective weeding, each process suffers from significant drawbacks as described below.

One method for removing negative design areas prior to heat transfer is laser weeding. Laser weeding involves using laser ablation to remove negative design areas. Laser ablation is a process by which a portion of a material is removed by rapidly heating the material with light from a laser so that a portion of the material is converted directly from a solid to gas. Specialty films have to be manufactured to use the laser cutting and ablation process. The heat transfer film is manufactured so that its transfer characteristics are preserved and is designed to minimize the toxicity of the gas resulting from ablation.

The laser weeding method contains significant drawbacks. Films with large variation in surface may be difficult to process. The reflective properties of the film must be designed so that laser ablation may take place. Because the films require specialized designs, many metallic or holographic films are difficult or impossible to weed in this manner. Additionally, laser ablation requires that the full negative area be traversed, rather than just the cut edge. This can greatly increase the cutting time for processing thermal transfer films. Thus, laser weeding is constrained to small designs using a constrained set of colors and surfaces.

Another method for removing negative design areas is selective thermal transfer. Selective thermal transfer involves designing a pigmented film that separates easily when a portion of it is subjected to selective heat application. A printing process may transfer pigmented waxes or thermoplastics directly from a carrier sheet or ribbon to a substrate. Specialty transfer materials may be manufactured with transferable dots, segments, or regions.

The selective thermal transfer technique also contains significant drawbacks. Because of the requirement for specially designed materials, certain types of optical effects are difficult to achieve. Additionally, constraints are placed on the durability of the material used for the transfer. Selective thermal transfer may also be imprecise and may result in broken or approximate edges for the transferred design. Finally, while heat presses can be created that conform to a variety of shapes and curvatures, building a machine for selective application of heat transfer for custom shapes or surfaces may be prohibitively expensive.

Masked thermal transfers may also be used to block the transfer of negative design areas. Using a masked thermal transfer is similar to the selective thermal transfer in that it involves using a film that separates easily when a portion of it is subjected to selective heat application. Masked thermal transfer also involves producing or printing a mask which can block the application of the negative portions of a design from the substrate. As with selective thermal transfer, masked thermal transfer techniques are constrained in the types of material that may be used to create the designs, thus limiting the durability and optical effects of the design.

Given the versatility of heat transfer films, it is useful to devise a system and method for the automated removal, or weeding, of the negative design areas prior to heat transfer that is integrated into the application of the cut thermal transfer film and that can be applied accurately to a large range of materials.

DETAILED DESCRIPTION In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

GENERAL OVERVIEW. A system and method for causing a specialized device to cut and weed a cut thermal transfer film is provided. In an embodiment, a service provider computer receives a request for one or more designs to be attached to a substrate. The service provider computer uses the design to generate additional instructions for a thermal transfer film cutting device that describe regions of the thermal transfer film to be cut to create the one or more designs, regions of the thermal transfer film to be cut to provide a registration means, and regions of the thermal transfer film to be attached to a receiving sheet. The service provider computer sends the additional instructions to the thermal transfer film cutting device which executes the instructions on a thermal transfer film.

Aspects of the disclosure generally relate to computer-implemented techniques for generating instructions for a device to remove negative areas from one or more designs. In an embodiment, a service provider computer receives one or more designs and generates instructions for a cutting device. The instructions may include one or more of: cutting instructions, registration instructions, or attachment instructions. The service provider computer transmits the instructions to a cutting device. Based on the instructions, the cutting device cuts one or more shapes into the film to create the one or more designs. The cutting device also cuts the film to create a registration means. The cutting device then attaches a receiving sheet to the negative portions of the design so that the negative portions of the design can be easily removed with the receiving sheet.

In an embodiment, a data processing method comprises receiving, at a service provider computer over a network, design data defining one or more designs; generating, at the service provider computer, a digitally programmed set of cutting instructions for a cutting device that describe regions of a film to be cut based on the design data; generating, at the service provider computer, a digitally programmed set of registration instructions for the cutting device that describe regions of a film to cut to create a registration means; generating, at the service provider computer, a digitally programmed set of attachment instructions for the cutting device that describe regions of a film to be attached to a receiving sheet; transmitting, from the service provider computer, the attachment instructions, the cutting instructions and the registration instructions to the cutting device; wherein executing the cutting instructions and registration instructions using one or more processors of the cutting device causes performing: causing a cutting means of the cutting device to cut a film on a backing sheet into the one or more designs based on the cutting instructions; causing the cutting means of the cutting device to cut the film and the backing sheet to provide a registration means based on the registration instructions; causing the cutting device to attach one or more unused portions of the one or more designs to the receiving sheet using an attachment means based on the attachment instructions.

In an alternate embodiment, a data processing method comprises receiving, at a service provider computer over a network, design data defining one or more designs; generating, at the service provider computer, a digitally programmed set of cutting instructions for a cutting device that describe regions of a film to be cut based on the design data; generating, at the service provider computer, a digitally programmed set of registration instructions for the cutting device that describe regions of a film to cut to create a registration means; generating, at the service provider computer, a digitally programmed set of attachment instructions for the cutting device that describe regions of a film to be attached to a receiving sheet; transmitting, from the service provider computer, the attachment instructions, the cutting instructions and the registration instructions to the cutting device; wherein executing the cutting instructions and registration instructions using one or more processors of the cutting device causes performing: causing a cutting means of the cutting device to cut a film on a backing sheet into the one or more designs based on the cutting instructions; wherein the film comprises printed indicia corresponding to the one or more designs; causing the cutting means of the cutting device to cut the film and the backing sheet to provide a registration means based on the registration instructions; causing the cutting device to attach the one or more designs to the transfer sheet using an attachment means based on the attachment instructions.

Other features and aspects of the disclosure will become apparent in the drawings, description, and the claims.

STRUCTURAL OVERVIEW. FIG. 1A is an example data flowchart depicting an infrastructure for automatically cutting a design on thermal transfer film using one or more computing devices.

Customer computer 120, design computer 130, and service provider computer 140 are communicatively coupled over network 110. In this arrangement, the computers may form a system that is configured or programmed to enable a customer that is associated with customer computer 120 to order custom printed products from a service provider that is associated with the service provider computer 140, and based upon designs that have been contributed to the service provider computer or an associated database by a designer that is associated with the design computer 130. The ZAZZLE service, commercially available from Zazzle Inc., Redwood City, Calif., is one example of a commercial embodiment of such a service.

Computers 120, 130, and 140 may be coupled using any of a LAN, WAN, or one or more internetworks, and each arrow shown in FIG. 1A with a straight line may represent a network link using any of a LAN, WAN, or one or more internetworks. Customer computer 120 may be a laptop, netbook, personal computer, mobile phone, smartphone, tablet, portable electronic device, or workstation associated with an individual user. Design computer 130 and service provider computer 140 may be server-class computers or multiple computers in a data center. Service provider computer 140 may be communicatively coupled to thermal transfer film cutting device 150 through one or more wireless or wired connections.

Design computer 130 may contain one or more files containing design data for one or more designs. Design data may indicate positive and negative areas of the design. In an embodiment, design data also includes printing instructions, such as color and design placement for a thermal transfer film.

Design data may be uploaded to one or more databases associated with service provider computer 140 under the direction of designers. The service provider computer 140 may review and approve the designs and make them available in an online catalog of available customizable products that customers may order. Customer computer 120 may interact with service provider computer 140 to display the one or more designs to a user of customer computer 120. When customer computer 120 receives input selecting one or more designs or customizable products, customer computer 120 may send the request for one or more designs to service provider computer 140.

Service provider computer 140 is coupled to a thermal transfer film cutting device 150, which may be programmed or configured with instructions to cause automatic computer-controlled cutting of thermal transfer film 160 to produce cut film 170. The cut film 170 then may be manually applied to a substrate 180 and thermally bonded to the substrate to produce a finished decorated product, including customized or personalized products. Examples of substrate 180 include wearing apparel, hats, bags, and toys.

Figure 1B:
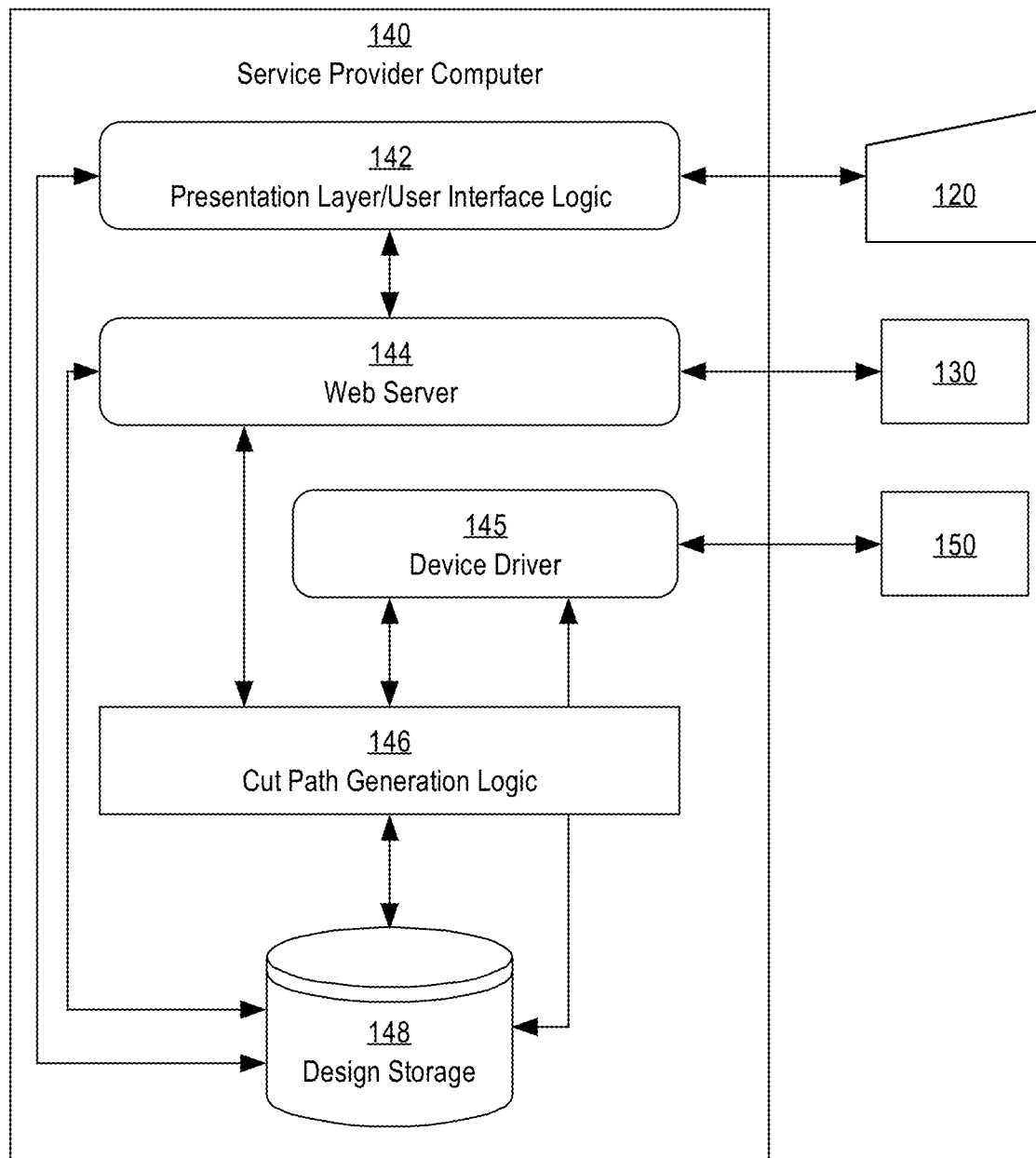
FIG. 1B illustrates an example logic architecture of the service provider computer.

FIG. 1B illustrates an example logic architecture of the service provider computer. In one embodiment, service provider computer 140 is programmed or configured with functional logic that may be used to facilitate a method for automatically cutting a design on thermal transfer film.

In one embodiment, service provider computer 140 contains presentation layer/user interface logic 142, web server 144, device driver 145, cut path generation logic 146, and design storage 148. Presentation layer/user interface logic 142 and web server 144 are programmed to interact with customer computer 120 and can access design storage 148. Device driver 145 is programmed to interact with thermal film cutting device 150 and can access design storage 148. Cut path generation logic 146 is coupled to web server 144, device driver 145, and design storage 148. Each of the foregoing elements is further described in structure and function in other sections herein. Service provider computer 130 also may include other devices, components, or elements of a computer system such as volatile or non-volatile memory, non-volatile storage such as disk, and I/O devices as seen and described, for example, in connection with FIG. 4. For purposes of illustrating a clear example, only those logical elements relevant to the present invention are shown and other embodiments may implement many other kinds of functional logic for other purposes, features or aspects of service.

Service provider computer 140 may be programmed to interact with customer computer 120 through presentation layer/user interface logic 142. Presentation layer/user interface logic 142 may be programmed or configured to present one or more design options to a user of customer computer 120 and to receive requests for one or more designs from the customer computer and may adapt presentation of this information to the type of device represented by customer computer 120. For example, an online catalog may be supported that enables a user to browse a large number of available customizable products, select one product of interest, select a design to be applied to the product, select color, size or other parameters for customization, and place an order for the customizable product. Presentation layer/user interface logic 142 may retrieve designs from design storage 148 to display to customer computing device 120 as part of the browsing or ordering process and produce device-specific user interface screen displays or similar information.

Service provider computer 140 may interact with design computer 130 through web server 144. Web server 144 may be configured to receive design data for one or more designs from design computer 130 when a designer elects to upload the design data to the service provider computer 140. Additionally, web server 144 may periodically make requests to design computer 130 for new design data relating to new designs. Web server 144 may cause design data to be stored in design storage 148. Web server 144, or other logic, may be programmed to implement a review workflow under which personnel associated with the service provider computer 140 may review and approve designs before the design data is released to the online catalog for use in customized product orders.

In some embodiments, when web server 144 receives one or more orders that specify particular designs, web server 144 may send the one or more designs to cut path generation logic 146. Alternatively, cut path generation logic 146 may retrieve the one or more designs from design storage in response to receiving an indication that presentation layer/user interface logic 142 received a request from customer computer 120 to order one or more products with particular designs.

Cut path generation logic 146 may be configured or programmed to generate instructions for thermal transfer film cutting device 150 using design data received from design storage 158. In some embodiments, cut path generation logic 146 uses a numerical control language, such as G-Code statements, to create cutting instructions for cutting device 150. G-Code is a language for numerical control of devices such as NC drilling machines and routers. G-Code consists of statements directing the 3-D motion of a machine. Cut path generation logic 146 may generate a cut path for a cutting means of thermal transfer film cutting device 150 using G-Code or similar languages. Cut path generation logic 146 may modify the cut path for the design based on the material used.

Cut path generation logic 146 may also generate registration instructions for thermal transfer film cutting device 150. Registration instructions may include data indicating how to cut portions of the film to provide a registration means for the receiving sheet. For example, a series of holes in specified locations may be cut so that the holes will snugly fit over corresponding pins in a platen of the device 150; the locations of these pins or other registration means may vary depending on the device and therefore the instructions may be programmed to conform to the location and type of registration means used with a particular device. Cut path generation logic 146 may be configured to determine one or more unused portions of the design to use for the registration means. That is, based upon data specifying a geometric location on the platen of the cutting device 150 that contains the registration means, the cut path generation logic 146 may adjust positioning of the cut path for the design so that cuts for the registration means can be accommodated. In some embodiments, cut path generation logic 146 stores the cutting instructions and registration instructions in design storage 148.

Design storage 148 may be configured or programmed to store design data relating to one or more designs received from designer computer 130 and instructions generated by cut path generation logic 146. The design storage 148 may comprise one or more tables or files that are integrated with data storage devices or databases that support other aspects of the system and separate dedicated design storage or instruction storage is not required. Design data may include a mapping of design elements, one or more images, or one or more instructions for image generation. Design data may be stored as individual files, in data structures in memory, in rows in a database table, in flat files or spreadsheets, or other forms of digitally stored data. Design storage 148 may include a database of designs indexed by unique design identifiers.

As used herein, the term "database" may refer to either a body of data, a relational database management system (RDBMS), or both. As used herein, a database may comprise any collection of data including hierarchical databases, relational databases, flat file databases, object-relational databases, object-oriented databases, and any other structured collection of records or data that is stored in a computer system. Examples of RDBMS's include, but are not limited to including, Oracle® Database, MySQL, IBM® DB2, Microsoft® SQL Server, Sybase®, and PostgreSQL. However, any database may be used that enables the systems and methods described herein.

Service provider computer 140 may interact with device 150 through device driver 145. Device driver 145 may be configured or programmed to send cutting instructions and registration instructions to thermal transfer film cutting device 150. Device driver 145 may receive the cutting instructions and registration instructions from cut path generation logic 146 or design storage 148. In some embodiments, device driver 145 receives cutting and registration instructions for a particular image from cut path generation logic 146 the first time the particular image is selected and from design storage 148 for each subsequent selection.

Thermal transfer film cutting device 150 may comprise one or more processors, a registration means, a cutting means, and an attachment means. The one or more processors may be configured or programmed to execute instructions received by service provider computer 140. In some embodiments, the one or more processors may be configured to receive design data and generate instructions based on the design data.

The registration means may be any method of holding thermal transfer film in a position that is fixed in relation to the cutting device in order to attach either a receiver sheet or a transfer sheet to the thermal transfer film in the same orientation. In an embodiment, the registration means is a flat aluminum platen with upwardly protruding registration pins that may engage or snugly grip corresponding holes in the film and sheets so that a stack consisting of the film and sheets is in fixed alignment. The registration means may also have a cut channel that is bigger than the maximum size of the transfer film to be processed but smaller than the receiver sheet. In an alternative embodiment, the registration means is a set of rollers that hold the thermal transfer film against a platen and which determines the position of the transfer film by optically detecting holes in the thermal transfer film that were created by the cutter.

The cutting means may be any method of cutting a design onto a thermal transfer film. In an embodiment, the cutting means is a sharp implement such as a needle or knife blade attached to a gantry robot that is controlled by a microcontroller. The cutting means may be used to trace a path on a thermal transfer film as described by the cutting instructions received from service provider computer 140. The cutting means may also be used to cut the transfer film in specific areas to provide a registration means. For example, the cutting means may be configured to cut holes for the registration pins described above. As another example, the cutting means may be configured to cut holes in the transfer film to be detected by the set of rollers described above.

The attachment means may be any method of attaching a receiving sheet or a transfer sheet to a thermal transfer film. In an embodiment, the attaching means is a thermal point source. The thermal point source may be a heat conductive material, such as copper, shaped to have a smooth point. Heat may be applied to the copper point using heat generated by electrical resistance. A modified or unmodified soldering iron could be used as the thermal point source. The thermal point source may be attached to a gantry with servo motors to position and control the heat source. In another embodiment, the registration means includes a set of rollers that move the thermal transfer film in one or more directions and the thermal point source is attached to a carriage that moves the thermal point source in one direction and a servo mechanism that moves the thermal point source towards or away from the thermal transfer film and applies pressure.

A heat sensor may be used to measure the heat of the thermal point source in order to maintain the temperature of the thermal point source at a given temperature. The given temperature may be set to the temperature needed to attach the thermal adhesive of the transfer films to a receiver sheet within a set distance from the center of the heat source.

Figure 2:
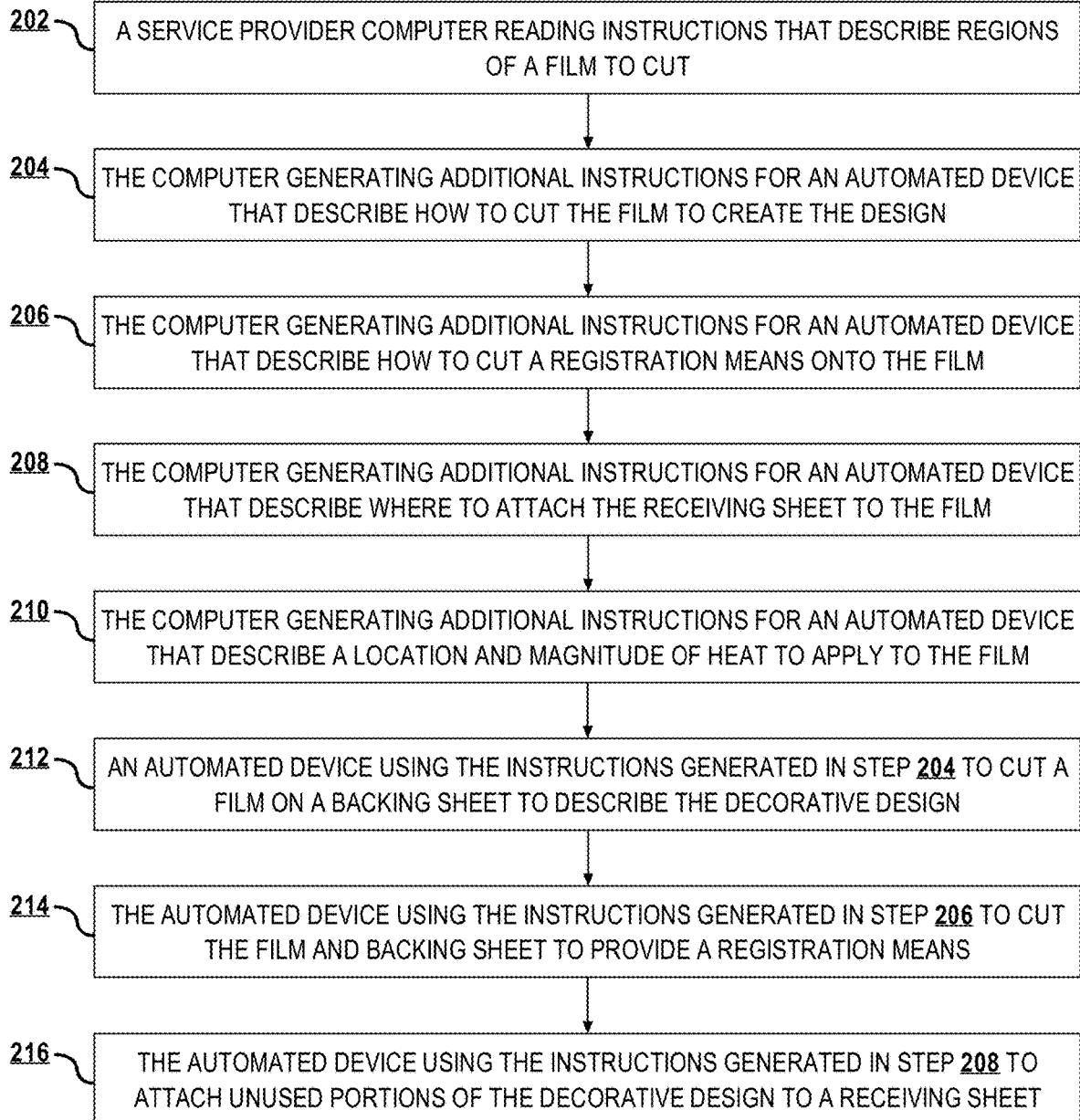
FIG. 2 is an example data flowchart for a method of automatically cutting a design on thermal transfer film.

THERMAL TRANSFER FILM CUTTING AND WEEDING. FIG. 2 is an example data flowchart for a method of automatically cutting a design on thermal transfer film.

At step 202, the process reads instructions that describe regions of a film to cut. For example, service provider computer 140 reads instructions that describe regions of a film to cut. At a basic level, the instructions may be a design in an image file, a PDF file, or any other type of document. More complicated instructions may define negative and positive portions of a design and areas of the design to cut.

At step 204, the process generates additional instructions that describe how to cut a film to create a design. For example, service provider computer 140 generates additional instructions for an automated device, such as thermal transfer film cutting device 150, that describes how to cut the film to create the design. As discussed above, generating additional instructions may include creating instructions in a numerical control language, such as G-Code, that define the movements of the cutting means of thermal transfer film cutting device 150.

At step 206, the process generates additional instructions that describe how to cut a registration means onto a film. For example, service provider computer 140 generates additional instructions for an automated device, such as thermal transfer film cutting device 150, that describe how to cut a registration means onto the film. The instructions for the registration means may be pre-programmed into service provider computer 140 and merely added to the instructions for cutting the film to create the design. In some embodiments, the instructions for the registration means are uniform for each design. For example, the instructions may define the corners of the thermal transfer film as the location for the registration means. In other embodiments, service provider computer 140 determines one or more locations on the thermal transfer film that do not overlap with the design for the placement of the registration means. In an embodiment, service provider computer 140 generates instructions to cut markings, such as holes, into the thermal transfer film that can be optically detected by one or more rollers of thermal transfer film cutting device 150.

At step 208, the process generates additional instructions that describe where to attach a receiving sheet to a film. For example, service provider computer 140 generates additional instruction for an automated device, such as thermal transfer film cutting device 150, that describe where to attach the receiving sheet to the film. In some embodiments, a receiving sheet is used by thermal transfer film cutting device 150 to remove negative areas from a design, as will be discussed below. Service provider computer 140 may determine the locations of the negative areas of the design and generate instructions for the attachment means to attach the receiving sheet to the negative areas. In other embodiments, a transfer sheet is used to remove the design from the negative areas of the design. Service provider computer 140 may determine the locations of the design on the thermal transfer film and generate instructions for the attachment means to attach the transfer sheet to the design areas.

In an embodiment, the instructions generated in step 208 are derived from the instructions generated in step 206. For example, the instructions generated in step 206 may be a path or vector for the cutting means to follow. The areas for attachment, as described below, may follow a similar path as the path or vector for the cutting means, but offset by a specified value. For example, if the path or vector for the cutting means describes a circle with the positive design regions inside the circle, the path of the attachment means may describe a larger circle centered on the first circle. Thus, the path for the attachment means would be the initial circle but offset by a specified value.

At step 210, the process generates additional instructions that describe how to apply heat to a film. For example, service provider computer 140 generates addition instructions for an automated device, such as thermal film cutting device 150, that describe a location and magnitude of heat to apply to the film. Thermal transfer film cutting device 150 may attach the receiving sheet to the thermal transfer film by applying heat to the transfer film in precise locations. Application of heat to attach the receiving sheet to the thermal transfer film is described in greater detail below.

Service provider computer 140 may generate instructions that determine the locations at which to apply heat and the amount of heat to apply in order to create an ideal attachment of the receiving sheet to the thermal transfer film. Generation of these instructions may be based on the instructions generated in step 208 which determine the areas of the thermal transfer film to attach to the receiving sheet.

At step 212, the process cuts a design on a backing sheet. For example, thermal transfer film cutting device 150 uses the instructions generated in step 204 to cut a film on a backing sheet to describe the decorative design.

Figure 3A:
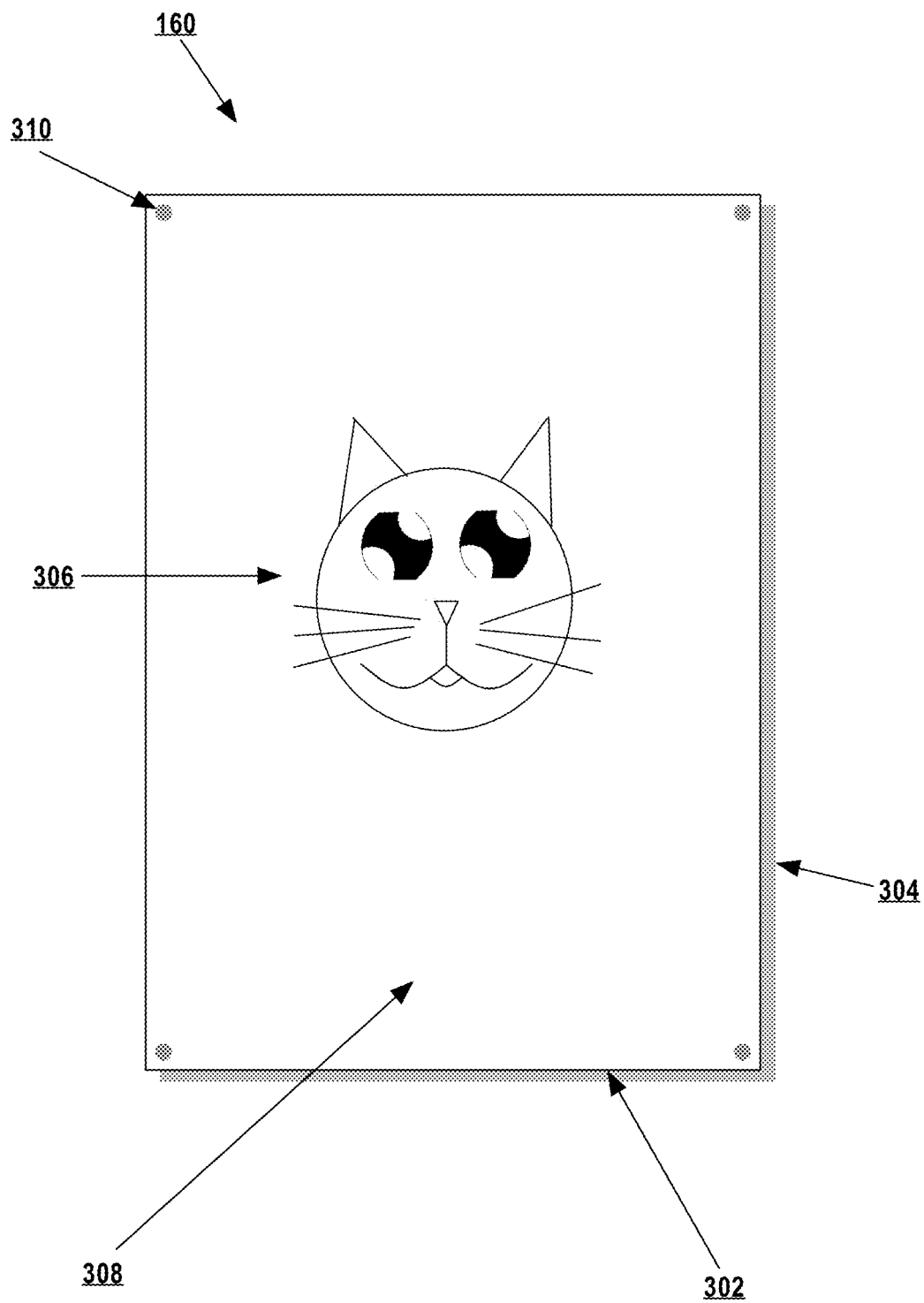
FIG. 3A depicts a thermal transfer film with a cut out design.

FIG. 3A depicts a thermal transfer film with a cut out design. Thermal transfer film 160 comprises film layer 302 and backing sheet 304. Film layer 302 may be coated with a thermal adhesive coating. In an embodiment, the cutting means used to cut transfer film 160 cuts film layer 302 without cutting backing sheet 304. Film layer 302 contains design 306. While design 306 is depicted as a printed design, in some embodiments design 306 may be an outline of a design. Design 306 may also include negative areas within the design. For example, the dark portions of the eyes in design 306 may be defined as a negative area of the design to be removed.

Thermal transfer film 160 also comprises negative region 308. Negative region 308 is an unused portion of thermal transfer film 160. While transfer film 160 is depicted as containing a single negative region, in various embodiments a design may contain a plurality of negative regions. The unused portion is the area that has been determined to not be a part of the overall design. For example, the chosen design in FIG. 3A may include a small area around the displayed face as a buffer zone. The small area would not be considered part of negative region 308.

Referring again to FIG. 2, at step 214, the process cuts a film and backing sheet to provide a registration means. For example, thermal transfer film cutting device 150 uses the instructions generated in step 206 to cut thermal transfer film 160 and backing sheet 304 to provide a registration means. Registration holes 310 are cut into thermal transfer film 160 to provide a method for attaching thermal transfer film 160 to thermal transfer film cutting device 150. Registration holes 310 may be cuts or marking that are capable of providing thermal transfer film cutting device 150 with a registration means.

After registration holes 310 are cut into thermal transfer film 160, thermal transfer film 160 may be attached to the registration means of thermal transfer film cutting device 150. In an embodiment, attaching the thermal transfer film to the registration means is a manual process. For example, the registration means may have pins in locations that correspond to registration holes 310 on the thermal transfer film. A person may place the thermal transfer film over the registration means so that the pins line up with registration holes 310.

Figure 3B:
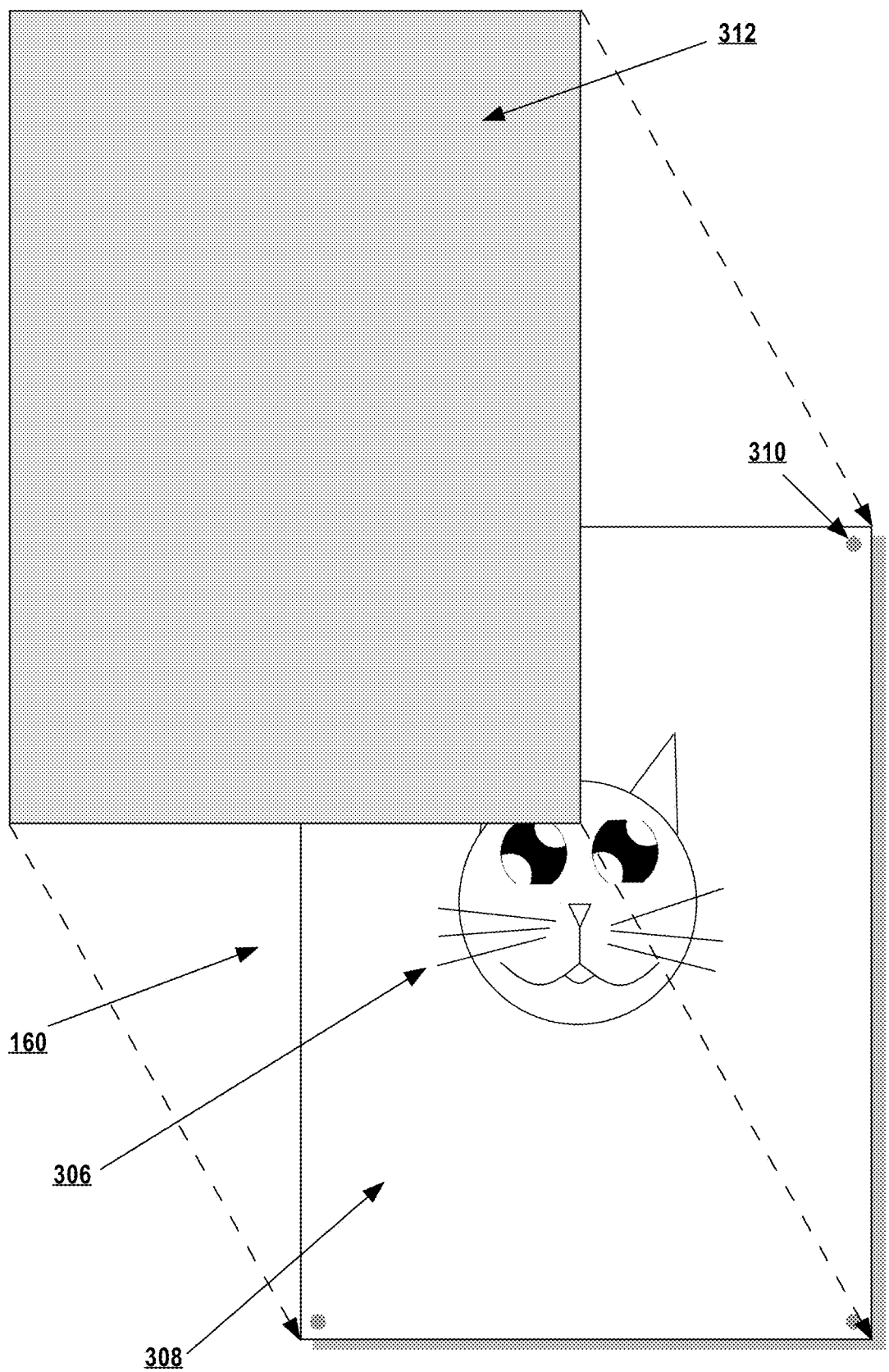
FIG. 3B depicts a receiver sheet being attached to the transfer film of FIG. 3A.

At step 216, the process attaches a receiving sheet to a film. For example, thermal transfer film cutting device 150 uses the instructions generated in step 208 to attach the receiving sheet to thermal transfer film 160. FIG. 3B depicts a receiving sheet being attached to the thermal transfer film of FIG. 3A. FIG. 3B includes thermal transfer film 160 and receiving sheet 312. Thermal transfer film cutting device 150 may use the registration means, such as registration holes 310 for example, and the instructions generated in step 208 to determine the placement of receiving sheet 312.

In an embodiment, attaching receiving sheet 312 to thermal transfer film 160 involves applying heat to specific portions of thermal transfer film 160. Applying heat to thermal transfer film 160 causes the thermal adhesive coating to attach to receiving sheet 312. The thermal point source of thermal transfer film cutting device 150 may apply heat to precise areas, causing only specific portions of thermal transfer film 160 to attach to receiving sheet 312. In this manner, thermal transfer film cutting device 150 may cause only negative region 308 to attach to receiving sheet 312.

To attach thermal transfer film 160 to a receiving sheet 312, the attachment means applies enough heat to negative region 308 to cause negative region 308 to attach to receiving sheet 312 without applying enough heat to attach the adjacent positive regions of design 306. Thus, in some areas a higher heat may be utilized to attach a larger portion of thermal transfer film 160 to receiving sheet 312 while in other areas a lower heat may be utilized to attach a smaller portion of thermal transfer film 160 to receiving sheet 312. The attachment resolution of thermal transfer film cutting device 150 may constrain the size of negative areas that may be removed. For example, if the finest attachment resolution for the thermal transfer film cutting device 150 is 0.5 millimeters, then thermal cutting device may apply the thermal point source to locations that are at least 0.5 millimeters away from design 306.

Additionally, the minimum attachment point for a thermal point source is twice the attachment resolution. A thermal point source with an attachment resolution of 0.5 millimeters would attach a 1-millimeter wide dot of thermal transfer film 160 to receiving sheet 312.

Service provider computer 140 may take into account the attachment resolution of thermal transfer film cutting device 150 in creating instructions for attaching thermal transfer film 160 to receiving sheet 312. Additionally, service provider computer 140 may be configured to determine the minimum tear span for the type of thermal transfer film used. While some thermal transfer films may separate easily, others may tear when negative region 308 is removed from thermal transfer film 160. A minimum tear span, defining the maximum distance between attachment points of a specific thermal transfer film that will not cause a tear when separated, may be defined for each type of thermal transfer film. Service provider computer 140 may be configured to create a path that attaches negative region 308 to receiving sheet 312 in a manner such that the distance between two attachment points does not drop below the minimum tear span.

Attaching the unused portions of the decorative design to the receiving sheet in step 216 may thus comprise thermal transfer film cutting device 150 tracing a path of heat along the edges of negative region 308, offset by the attachment resolution of the thermal point source and separated by a maximum distance of the minimum tear span. Thermal transfer film cutting device 150 then outputs the combined thermal transfer film with negative region 308 attached to receiving sheet 312.

Figure 3C:
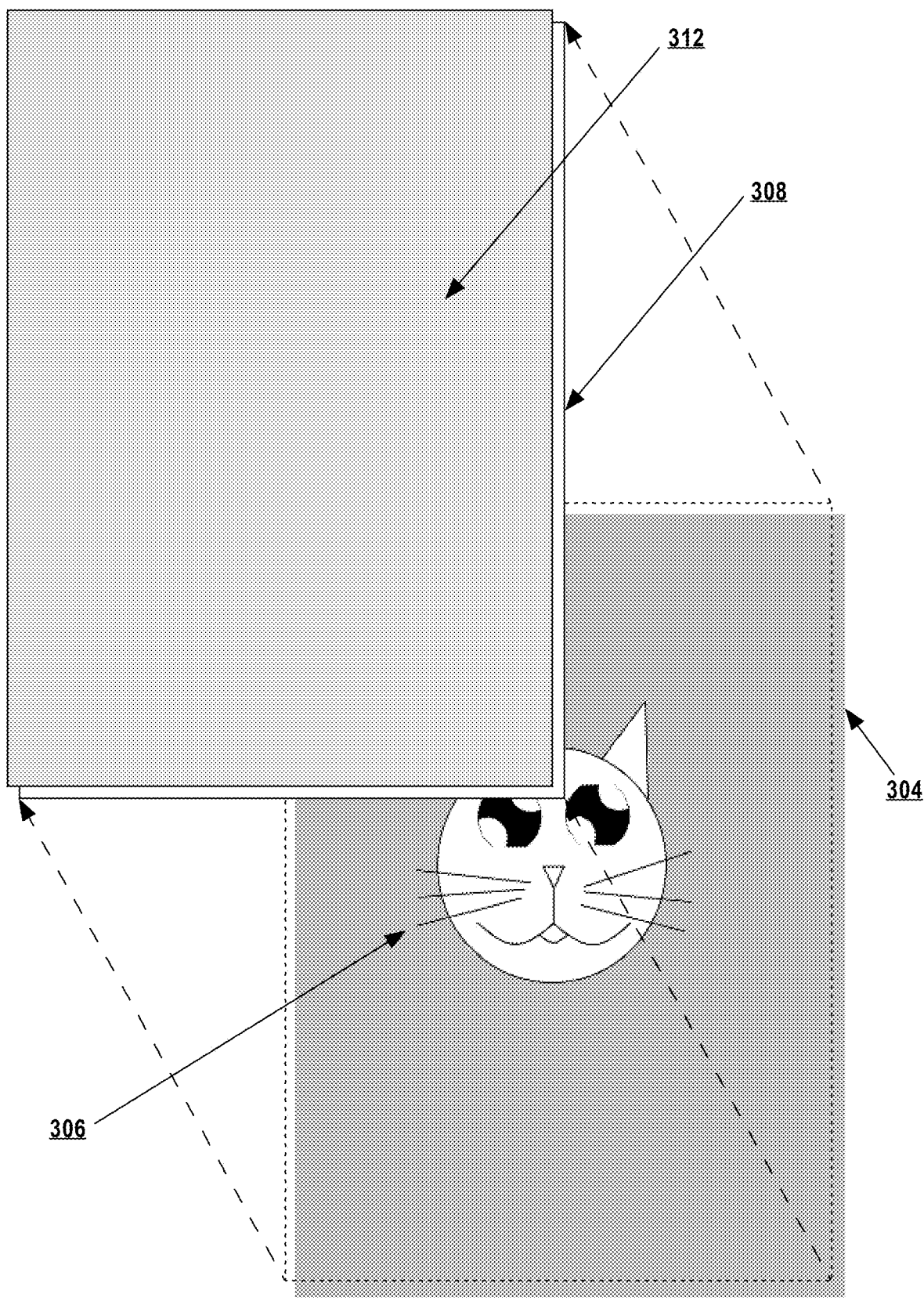
FIG. 3C depicts the receiver sheet being used to remove the negative areas of the design on the transfer film of FIG. 3A.

In an embodiment, a manual process involves removing negative region 308 from thermal transfer film 160. FIG. 3C depicts the receiver sheet being used to remove the negative areas of the design on the transfer film of FIG. 3A. In FIG. 3C, a person removes receiving sheet 312 from thermal transfer film 160. Negative region 308 can be removed with receiving sheet 312 due to the attachment created in step 216. Since design 306 has been cut away from negative region 308, design 306 is not removed when receiving sheet 312 is separated.

In some embodiments, the cutting means only cuts film layer 302 of thermal transfer film 160. When receiving sheet 312 is removed from thermal transfer film 160, negative region 308 is also removed from backing sheet 304. In these embodiments, the result of removing negative region 308 with receiving sheet 312 is design 306 on backing sheet 304, as shown in FIG. 3C. In other embodiments, backing sheet 304 is also cut by the cutting means. In those embodiments, cut film 170 includes design 306 on backing sheet 304 cut into the same shape as design 306, as shown in FIG. 1A.

Once the negative region 308 has been removed from thermal transfer film 160, cut film 170 may be attached to substrate 180. Substrate 180 may be any base material that is capable of being attached to cut film 170, including fabrics, textiles, plastic substrates, or paper. Using a heat press device, a person may attach cut film 170 to substrate 180.

OTHER EMBODIMENTS. In many embodiments, thermal transfer film 160 contains a thermal adhesive coating that faces away from backing sheet 304. In some embodiment, a thermal transfer film which accepts inkjet printing is used, allowing a design to be pre-printed on the thermal transfer film before the weeding process. Different methods may be used for transferring the pre-printed designs depending on whether the backing sheet can accept thermal attachment to the negative design areas of the design.

In an embodiment, the backing sheet is capable of accepting thermal attachment to the negative design areas of the design. Thermal transfer film 160 may include film layer 302 with a thermal adhesive coating that faces backing sheet 304 and a printed side that faces away from backing sheet 304. After thermal transfer film cutting device 150 cuts design 306 and registration holes 310 into thermal transfer film 160, thermal transfer film 160 may be attached to the registration means of thermal transfer film cutting device 150. Thermal transfer film cutting device 150 may use a thermal point source to attach negative region 308 to backing sheet 304. A transfer sheet that is coated with a repositionable adhesive may be pressed firmly to design 306 to cause the transfer sheet to adhere to design 306. The transfer sheet may then be used to remove design 306 from negative region 308 and backing sheet 304. The transfer sheet may then be used to align design 306 with substrate 180. Design 306 may be attached to substrate 180 through use of a heat press. The transfer sheet may then be removed from design 306.

In an alternative embodiment, the backing sheet is not capable of accepting thermal attachment to the negative design areas of the design. Thermal transfer film cutting device 150 may attach negative region 308 to receiving sheet 312 in a similar manner as described above. Receiving sheet 312 may then be used to remove negative region 308 from thermal transfer film 160. A transfer sheet that is coated with a repositionable adhesive may be pressed firmly to design 306 to cause the transfer sheet to adhere to design 306. The transfer sheet may then be used to remove design 306 from backing sheet 304. The transfer sheet may then be used to align design 306 with substrate 180. Design 306 may be attached to substrate 180 through use of a heat press. The transfer sheet may then be removed from design 306.

HARDWARE OVERVIEW. According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which embodiments may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated service digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

OTHER DISCLOSURE. The following numbered clauses provide further disclosure and are not intended as formal claims.

1. A method comprising: receiving, at a service provider computer over a network, design data defining one or more designs; generating, at the service provider computer, a digitally programmed set of cutting instructions for a cutting device that describe regions of a film to be cut based on the design data; generating, at the service provider computer, a digitally programmed set of registration instructions for the cutting device that describe regions of a film to cut to create a registration means; generating, at the service provider computer, a digitally programmed set of attachment instructions for the cutting device that describe regions of a film to be attached to a receiving sheet; transmitting, from the service provider computer, the attachment instructions, the cutting instructions and the registration instructions to the cutting device; wherein executing the cutting instructions and registration instructions using one or more processors of the cutting device causes performing: causing a cutting means of the cutting device to cut a film on a backing sheet into the one or more designs based on the cutting instructions; causing the cutting means of the cutting device to cut the film and the backing sheet to provide a registration means based on the registration instructions; causing the cutting device to attach one or more unused portions of the one or more designs to the receiving sheet using an attachment means based on the attachment instructions; wherein the method is performed by one or more computing devices.

2. The method of clause 1 wherein the attachment instructions are derived from the cutting instructions based on offsetting a vector region.

3. The method of clause 1 wherein the registration means comprises two or more holes that are configured to snugly fit over two or more corresponding pins on a platen of the cutting device.

4. The method of clause 1 wherein attaching the one or more unused portions of the one or more designs to the receiving sheet comprises the cutting device using a thermal point source to heat a thermal adhesive on unused portions of the one or more designs.

5. The method of clause 1: wherein the film comprises printed indicia corresponding to the one or more designs; wherein the cutting device attaching the one or more unused portions of the one or more designs to the receiving sheet comprises the cutting device attaching a printed side of the one or more unused portions of the one or more designs to the receiving sheet with a thermal adhesive; the method further comprising: the one or more processors causing the cutting device to attach the printed side of the one or more designs to a transfer sheet based on the attachment instructions.

6. A method comprising: receiving, at a service provider computer over a network, design data defining one or more designs; generating, at the service provider computer, a digitally programmed set of cutting instructions for a cutting device that describe regions of a film to be cut based on the design data; generating, at the service provider computer, a digitally programmed set of registration instructions for the cutting device that describe regions of a film to cut to create a registration means; generating, at the service provider computer, a digitally programmed set of attachment instructions for the cutting device that describe regions of a film to be attached to a transfer sheet; transmitting, from the service provider computer, the attachment instructions, the cutting instructions and the registration instructions to the cutting device; wherein executing the cutting instructions and registration instructions using one or more processors of the cutting device causes performing: causing a cutting means of the cutting device to cut a film on a backing sheet into the one or more designs based on the cutting instructions; wherein the film comprises printed indicia corresponding to the one or more designs; causing the cutting means of the cutting device to cut the film and the backing sheet to provide a registration means based on the registration instructions; causing the cutting device to attach the one or more designs to the transfer sheet using an attachment means based on the attachment instructions; wherein the method is performed by one or more computing devices.

7. The method of clause 6 wherein the attachment instructions are derived from the cutting instructions based on offsetting a vector region.

8. The method of clause 6 wherein the registration means comprises two or more holes that are configured to snugly fit over two or more corresponding pins on a platen of the cutting device.

9. The method of clause 6 wherein attaching the one or more designs to the transfer sheet comprises the cutting device coating the transfer sheet with a repositionable adhesive and pressing a coated surface of the transfer sheet against the one or more designs.

10. A system comprising: a web server of a service provider computer, configured to receive, over a network, design data defining one or more designs; a cut path generation logic component of a service provider computer, configured to: generate a digitally programmed set of cutting instructions for a cutting device that describe regions of a film to be cut based on the design data; generate a digitally programmed set of registration instructions for a cutting device that describes regions of a film to cut to create a registration means; generate a digitally programmed set of attachment instructions for the cutting device that describe regions of a film to be attached to a receiving sheet; wherein the web server of the service provider computer is further configure to transmit the cutting instructions, the registration instructions, and the attachment instructions to the cutting device; one or more processors of the cutting device, configured to receive and execute the cutting instructions and the registration instructions; a cutting means of the cutting device, configured to cut a film on a backing sheet into the one or more designs based on the cutting instructions and to cut the film on the backing sheet to provide a registration means based on the registration instructions; an attachment means of the cutting device, configured to attach one or more unused portions of the one or more designs to the receiving sheet based on the attachment instructions.

11. The system of clause 10 wherein the attachment instructions are derived from the cutting instructions based on offsetting a vector region.

12. The system of clause 10 wherein the registration means comprises two or more holes that are configured to snugly fit over two or more corresponding pins on a platen of the cutting device.

13. The system of clause 10 wherein the attachment means of the cutting device is configured to attach the one or more unused portions of the one or more designs to the receiving sheet by using a thermal point source to heat a thermal adhesive on unused portions of the one or more designs.

14. The system of clause 10: wherein the film comprises printed indicia corresponding to the one or more designs;

wherein the attachment means of the cutting device is configured to attach the one or more unused portions of the one or more designs to the receiving sheet by attaching a printed side of the one or more unused portions of the one or more designs to the receiving sheet with a thermal adhesive; wherein the attachment means of the cutting device is further configured to attach the printed side of the one or more designs to a transfer sheet based on the attachment instructions.

15. A system comprising: a web server of a service provider computer, configured to receive, over a network, design data defining one or more designs; a cut path generation logic component of a service provider computer, configured to: generate a digitally programmed set of cutting instructions for a cutting device that describe regions of a film to be cut based on the design data; generate a digitally programmed set of registration instructions for a cutting device that describes regions of a film to cut to create a registration means; generate a digitally programmed set of attachment instructions for the cutting device that describe regions of a film to be attached to a transfer sheet; wherein the web server of the service provider computer is further configure to transmit the cutting instructions, the registration instructions, and the attachment instructions to the cutting device; one or more processors of the cutting device, configured to receive and execute the cutting instructions and the registration instructions; a cutting means of the cutting device, configured to cut a film comprising printed indicia corresponding to the one or more designs on a backing sheet into the one or more designs based on the cutting instructions and to cut the film on the backing sheet to provide a registration means based on the registration instructions; an attachment means of the cutting device, configured to attach the one or more designs to the transfer sheet based on the attachment instructions.

16. The system of clause 15 wherein the attachment instructions are derived from the cutting instructions based on offsetting a vector region.

17. The system of clause 15 wherein the registration means comprises two or more holes that are snugly fit over two or more corresponding pins on a platen of the cutting device.

18. The system of clause 15 wherein the attachment means attaches the one or more designs to the transfer sheet by coating the transfer sheet with a repositionable adhesive and pressing a coated surface of the transfer sheet against the one or more designs.

6. EXTENSIONS AND ALTERNATIVES

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A computer-based system for manufacturing a custom product by applying, to a product, a decorative design imprinted in an adhesive film, the computer-based system comprising:

a service provider computer that is configured to:
automatically determine, in an adhesive film, one or more regions that collectively depict a decorative design printed on the adhesive film and to be used to generate a custom product;
wherein the service provider computer is further configured to:
automatically generate cutting instructions that describe how to cut registration means in the adhesive film;
wherein the registration means includes one or more of: lines, dots or holes;
wherein the registration means defines a path that encloses the one or more regions that collectively depict the decorative design included in the adhesive film;
wherein the path is larger by an offset than a border enclosing the one or more regions;
wherein the service provider computer is further configured to:
provide the cutting instructions to a registration device to cause the registration device to automatically cut the registration means in the adhesive film according to the cutting instructions;
cause a cutting device to optically detect the registration means in the adhesive film and to generate a cut-out-shape by cutting the adhesive film along the path;
wherein the cut-out-shape corresponds to the decorative design and is to be used to generate the custom product.

2. The computer-based system of claim 1, wherein the decorative design is printed on the adhesive film using an inkjet printing technique; wherein the service provider computer is further configured to cause: a manufacturing device to use a substrate color of the custom product to print edges around the decorative design in addition to edges of the decorative design rendered based on the cut-out-shape cut from the adhesive film; wherein the substrate color is selected from a visible color range.

3. The computer-based system of claim 1, wherein the service provider computer is further configured to cause: a manufacturing device to use a substrate texture of the custom product to print edges around the decorative design in addition to edges of the decorative design rendered based on the cut-out-shape cut from the adhesive film; wherein the substrate texture is selected from a visible texture range.

4. The computer-based system of claim 1, wherein the offset by which the path defined by the registration means is larger than the border enclosing the one or more regions is larger than a smallest size of one or more of: a printable line or a printable dot.

5. The computer-based system of claim 1, wherein a count of one or more of: lines, dots, or holes, that are included in the registration means does not exceed a limit value.

6. The computer-based system of claim 1, wherein the service provider computer is further configured to automatically determine which portions of the decorative design are to be rendered based on the cut-out-shape and which portions of the decorative design are to be rendered using a printing method.

7. The computer-based system of claim 1, wherein the service provider computer is further configured to:
generate and transmit one or more manufacturing instructions comprising a cut film manufacturing means for generating the custom product;

generate and transmit one or more printing instructions comprising a printing manufacturing means for printing a design on the custom product.

8. One or more non-transitory computer-readable storage media storing one or more instructions which, when executed by one or more processors, cause the one or more processors to perform:
- automatically determining, in an adhesive film, one or more regions that collectively depict a decorative design printed in the adhesive film and to be used to generate a custom product;
- automatically generating cutting instructions that describe how to cut registration means in the adhesive film;
- wherein the registration means includes one or more of: lines, dots or holes;
- wherein the registration means defines a path that encloses the one or more regions that collectively depict the decorative design included in the adhesive film;
- wherein the path is larger by an offset than a border enclosing the one or more regions;
- providing the cutting instructions to a registration device to cause the registration device to automatically cut the registration means in the adhesive film according to the cutting instructions;
- causing a cutting device to optically detect the registration means in the adhesive film and to generate a cut-out-shape by cutting the adhesive film along the path;
- wherein the cut-out-shape corresponds to the decorative design and is to be used to generate the custom product.

9. The one or more non-transitory computer-readable storage media of claim 8, storing additional instructions for: using a substrate color of the custom product to print edges around the decorative design in addition to edges of the decorative design rendered based on the cut-out-shape cut from the adhesive film; wherein the substrate color is selected from a visible color range.

10. The one or more non-transitory computer-readable storage media of claim 8, storing additional instructions for: using a substrate texture of the custom product to print edges around the decorative design in addition to edges of the decorative design rendered based on the cut-out-shape cut from the adhesive film; wherein the substrate texture is selected from a visible texture range.

11. The one or more non-transitory computer-readable storage media of claim 8, wherein the offset by which the path defined by the registration means is larger than the border enclosing the one or more regions is larger than a smallest size of one or more of: a printable line or a printable dot.

12. The one or more non-transitory computer-readable storage media of claim 8, wherein a count of one or more of: lines, dots, or holes, that are included in the registration means does not exceed a limit value.

13. The one or more non-transitory computer-readable storage media of claim 8, storing additional instructions for: automatically determining which portions of the decorative design are to be rendered based on the cut-out-shape and which portions of the decorative design are to be rendered using a printing method;
- generating and transmitting one or more manufacturing instructions comprising a cut film manufacturing means for generating the custom product;
- generating and transmitting one or more printing instructions comprising a printing manufacturing means for printing a design on the custom product.

* * * * *